(12) United States Patent
McPherson et al.

(10) Patent No.: US 12,514,260 B2
(45) Date of Patent: Jan. 6, 2026

(54) EMULSIFYING SALT-FREE AND STARCH STABILIZED CHEESE

(71) Applicant: KRAFT FOODS GROUP BRANDS LLC, Chicago, IL (US)

(72) Inventors: Andrew Edward McPherson, Mt. Prospect, IL (US); Tori Ann Boomgaarden, Rochester, MN (US); Brian E. LeVine, Northbrook, IL (US); Gary Francis Smith, Glenview, IL (US)

(73) Assignee: Kraft Foods Group Brands LLC, Chicago, IL (US)

( * ) Notice: Subject to any disclaimer, the term of this patent is extended or adjusted under 35 U.S.C. 154(b) by 332 days.

(21) Appl. No.: 16/986,452

(22) Filed: Aug. 6, 2020

(65) Prior Publication Data

US 2020/0359643 A1    Nov. 19, 2020

Related U.S. Application Data

(63) Continuation of application No. 13/708,487, filed on Dec. 7, 2012, now abandoned.

(51) Int. Cl.
| | |
|---|---|
| *A23C 19/082* | (2006.01) |
| *A23C 19/08* | (2006.01) |
| *A23C 19/09* | (2006.01) |
| *A23L 29/219* | (2016.01) |
| *C08B 30/14* | (2006.01) |

(Continued)

(52) U.S. Cl.
CPC ............ *A23C 19/082* (2013.01); *A23C 19/08* (2013.01); *A23C 19/0904* (2013.01); *A23L 29/219* (2016.08); *C08B 30/14* (2013.01); *C08L 3/02* (2013.01); *C08L 3/12* (2013.01)

(58) Field of Classification Search
USPC ......................................... 426/580, 582, 661
See application file for complete search history.

(56) References Cited

U.S. PATENT DOCUMENTS

| | | | |
|---|---|---|---|
| 3,635,741 | A | 1/1972 | Szymanski |
| 4,552,774 | A | 11/1985 | Gronfor |
| 4,608,265 | A | 8/1986 | Zwiercan |
| 5,192,576 | A | 3/1993 | Chang |

(Continued)

FOREIGN PATENT DOCUMENTS

| | | |
|---|---|---|
| CA | 1110102 | 10/1981 |
| CN | 102007972 | 4/2011 |

(Continued)

OTHER PUBLICATIONS

Bemiller et al., "Starch: Chemistry and Technology," Academic Press, Inc., Third Edition 2009, 3 pages.

(Continued)

*Primary Examiner* — Emily M Le
(74) *Attorney, Agent, or Firm* — Fitch, Even, Tabin & Flannery LLP

(57) ABSTRACT

Emulsifying salt-free processed cheese products as well as methods of preparing emulsifying salt-free processed cheese products are provided. The emulsifying salt-free processed cheese products are prepared with modified starch containing amylopectin and substantially no amylase and without emulsifying salts. The emulsifying salt-free processed cheese products are advantageously resistant to separation during heating and retain desirable organoleptic properties, such as texture and flavor, without using emulsifying salts.

19 Claims, 17 Drawing Sheets

(51) Int. Cl.
*C08L 3/02* (2006.01)
*C08L 3/12* (2006.01)

(56) References Cited

U.S. PATENT DOCUMENTS

| | | | |
|---|---|---|---|
| 5,234,707 | A | 8/1993 | Merkenich |
| 5,244,687 | A | 9/1993 | Rybinski |
| 5,626,893 | A | 5/1997 | Reddy |
| 5,807,601 | A | 9/1998 | Carpenter |
| 6,261,625 | B1 | 7/2001 | Pickford |
| 6,506,426 | B2 | 1/2003 | Adamany |
| 6,998,145 | B2 | 2/2006 | Henry |
| 7,309,510 | B2 | 12/2007 | Sekula |
| 7,807,207 | B2 | 10/2010 | Huang |
| 7,815,957 | B2 | 10/2010 | Smith |
| 7,976,886 | B2 | 7/2011 | Merrill |
| 2003/0157232 | A1 | 8/2003 | Buwalda |
| 2005/0129826 | A1 | 6/2005 | Warmerdam |
| 2006/0210694 | A1 | 9/2006 | Chappell |
| 2009/0061065 | A1 | 3/2009 | Reyes |
| 2009/0092730 | A1 | 4/2009 | Smith |
| 2009/0186129 | A1 | 7/2009 | Gamay |
| 2010/0278994 | A1 | 11/2010 | Klemaszewski |
| 2011/0244105 | A1 | 10/2011 | Galer |

FOREIGN PATENT DOCUMENTS

| | | |
|---|---|---|
| CN | 102265934 | 12/2011 |
| CN | 102450335 | 5/2012 |
| CN | 102669294 | 9/2012 |
| CN | 102687755 | 9/2012 |
| EP | 1145646 | 10/2001 |
| WO | 2009079002 | 6/2009 |
| WO | 2010140905 | 12/2010 |

OTHER PUBLICATIONS

International Search Report and Written Opinion relating to PCT/US2013/071958, 9 pages June 201.
International Search Report and Written Opinion relating to PCT/US2014/020581, 8 pages Jun. 2014.
John S Mounsey et al, "Modification of imitation cheese structure and rheology using pre-gelatinised starches", European Food Research and Technology; Zeitschrift für Lebensmitteluntersuchung Und—Forschung A, Springer, Berlin, DE, (Apr. 12, 2007), vol. 226, No. 5, ISSN 1438-2385, pp. 1039-1046, XP019585017 https://rd.springer.com/article/10.1007/s00217-007-0629-5 (Abstract).
Tate & Lyle Food Starch Application Grid, available at https://web.archive.org/web/20110108051429/htlp://tateandlyle.com/ingredientsandservices/Chooseaningredientorservice/Americas/Documents/Food_Starch_Application_Grid.pdf as of Jan. 8, 2011, 4 pages.
Tate & Lyle High Performance Cook-Up Starches Product Application Grid available at https://web.archive.org/web/20080621214957/http://www.tateandlyle.com/TateAndLyle/products_applications/product_application_grids/americas/ high_performance_cookup_starches.htm as of Jun. 21, 2008.
Whistler et al., "Starch: Chemistry and Technology," Academic Press, Inc., Second Edition 1984, 3 pages.
Wurzburg et al., "Modified Starches: Properties and Uses," CRC Press, Inc., 1986. 5 pages.
Ye A et al, "Characteristics of rennetcasein-based model processed cheese containing maize starch: Rheological properties, meltabilities and microstructures", Food Hydrocolloids, Elsevier BV, NL, vol. 23, No. 4, doi:10.1016/J.FOODHYD.2008.08.016, ISSN 0268-005X, (Jun. 1, 2009), pp. 1220-1227, (Sep. 16, 2008), XP025817639 https://www.sciencedirect.com/science/article/pii/S0268005X08002142.

t= 0 min, Temp approximate 100°F (38°C)

t=2 min, 120 °F (49°C)

t = 4 min; 140°F (60°C)

t= 6 min; 160°F (71°C)

Final Shear Step

Starch Pasting Profile Comparison

Shur-Fil® 677 Lightly Substituted (LS) Micrograph Samples (20x)

Cooked Slurry (155°F)

Uncooked Slurry (30% w/v starch)

Shur-Fil® 677 Lightly Substituted (LS) Micrograph Samples (20x)

Sheared Cheese Sauce

Cooked Cheese Sauce (162°F)

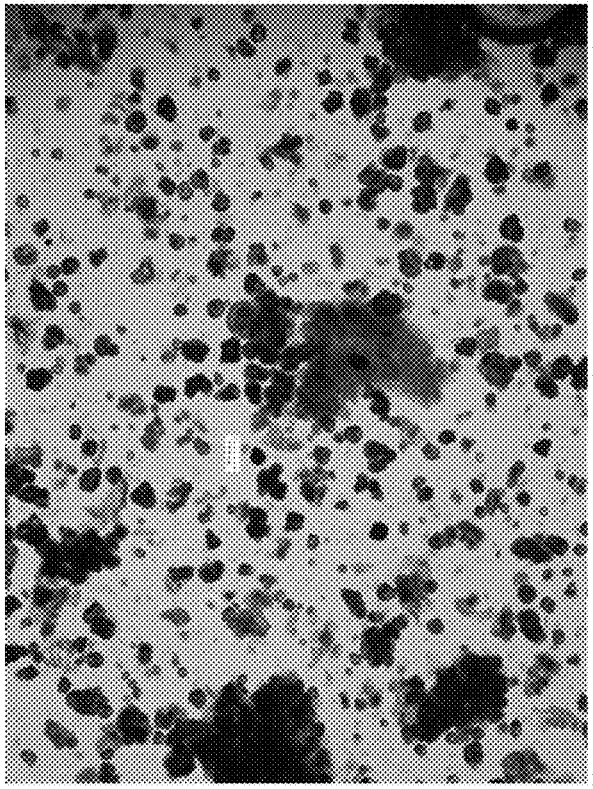
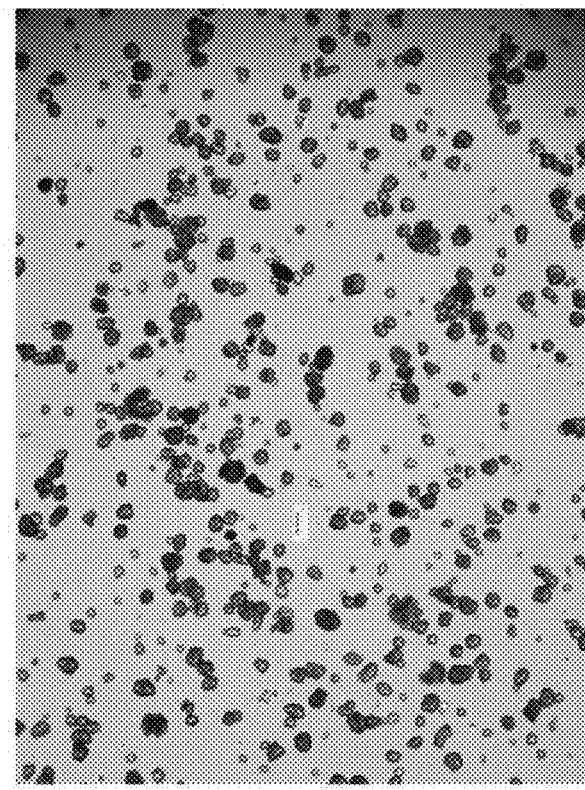
National® 150 Erythorbic Acid Impregnated (EA) Micrograph Samples (20x)
Cooked Slurry (165°F)
Figure 5B
Uncooked Slurry (30% w/v starch)
Figure 5A National® 150 Erythorbic Acid Impregnated (EA) Micrograph Samples (20x)

Sheared Cheese Sauce

Cooked Cheese Sauce (162°F)

Cooked Slurry (160°F)

Uncooked Slurry (30% w/v starch)

Amioca Waxy Corn Starch (WC) Micrograph Samples (20x)

Amioca Waxy Corn Starch (WC) Micrograph Samples (20x)

Cooked Cheese Sauce (162°F)

Sheared Cheese Sauce

Cooked Slurry (165°F)

Uncooked Slurry (30% w/v starch)

Native Corn Starch Micrograph Samples (20x)

Native Corn Starch Micrograph Samples (20x)

Sheared Cheese Sauce

Cooked Cheese Sauce (162°F)

EMULSIFYING SALT-FREE AND STARCH STABILIZED CHEESE

CROSS REFERENCE TO RELATED APPLICATION

The present application is a continuation of U.S. patent application Ser. No. 13/708,487, filed on Dec. 7, 2012, which is incorporated by reference herein in its entirety.

FIELD

The field relates to emulsifying salt-free cheese, and methods of producing such cheese. More specifically, the field relates to processed cheese prepared without the use of emulsifying salts in dairy protein and/or high moisture systems with improved stability.

BACKGROUND

Processed cheese can be formed in a variety of product forms, such as slices, shreds, loaves, sauces, dips, and the like, which enjoy widespread consumer use. Processed cheese typically has an extended shelf-life in comparison to natural cheese which makes processed cheese a popular choice amongst consumers. However, processed cheese, in some cases, lacks the full cheese flavor found in more natural cheeses.

Processed cheese is commonly produced by comminuting and mixing together natural cheese, other dairy ingredients, emulsifiers, salt, and optionally food colorings under a combination of heat and shear. Various types of natural cheese as well as blends thereof may be used to provide various flavor profiles.

Emulsifying salts are commonly used in processed cheese to create a cheese that melts smoothly and resists separation when cooked. Emulsifying salts reduce the tendency for fat in the cheese to coalesce and pool on the surface of the molten cheese during cooking and during subsequent heating. Typical emulsifying salts include sodium and potassium citrates, monophosphates, polyphosphates and the like. It is believed that the emulsifying salts complex with calcium ions in the cheese to solubilize protein, increase protein hydration and swelling to facilitate the emulsification of fat, and to adjust and stabilize the pH in order to form a processed cheese that melts smoothly with a reduced tendency of fat to coalesce and pool. Furthermore, casein is the dominant class of proteins present in milk, and is essentially the protein left in cheese after the whey (including whey proteins) has been drained off. Most types of casein have calcium phosphate groups. The higher the level of calcium, the less soluble the casein. Another function of the emulsifying salts in processed cheese is to bind with the calcium to increase the solubility of the casein.

Consumers are increasingly aware of the composition of foods. Thus, there is a desire to prepare processed cheese with more natural ingredients and with less or without emulsifying salts. Prior attempts at producing a processed cheese without emulsifying salts, however, have compromised one or more of the desired characteristics of processed cheese. For instance, some emulsifying salt-free cheese preparations have focused on decreasing the calcium content of one or more dairy ingredients in the cheese product. Processed cheese without emulsifying salts has been prepared through the use of calcium reduced casein sources; however, such approach is not suitable for all types of cheeses, such as, for example, higher moisture processed cheese products like sauces and spreads, and tends to produce a melt-restricted cheese. In other approaches, cheese products prepared without emulsifying salts have relied heavily on starches and hydrocolloid stabilizers to provide in-process and final product stability. These approaches, however, result in several disadvantages to the resultant cheese. The starches and hydrocolloids add texture to the final product that, again, is unsuitable for some types of cheese. The use of starches and hydrocolloids may also inhibit flavor release, and often leads to starchy and/or undesirable flavors, textures, and mouthfeel.

In other cases, processed cheeses without emulsifying salts may be prepared by modifying and/or essentially removing all the casein from the cheese. As casein is one of the predominant dairy proteins in cheese, it can be appreciated that processed cheese prepared using a casein less or a substantially casein-reduced cheese will tend to lack the flavor intensity of more natural cheeses as compared to processed cheese prepared using non-casein reduced cheese. As a result, the preparation of emulsifying salt-free processed cheeses without altered protein levels, at high moisture contents, and/or at high dairy protein levels tends to result in unstable cheese products which have undesirable textures, flavors, and other characteristics.

SUMMARY

A processed cheese that does not contain significant levels of emulsifying salts is provided in one aspect of the disclosure. In one approach, the processed cheese includes a natural cheese or a mixture of natural cheeses providing from about 5 weight percent to about 95 weight percent dairy protein. The cheese further includes about 30 weight percent to about 80 weight percent water, and about 0.5 weight percent or less of emulsifying salts so that the processed cheese does not contain significant levels of emulsifying salts. The processed cheese also includes about 0.1 weight percent to about 10 weight percent of a modified starch that contains amylopectin and substantially no amylose. The modified starch is effective to provide a uniform distribution of the amylopectin in the processed cheese with substantially no intact starch granules and substantially no starch agglomerates, and with less than about 0.1 percent amylose so that the processed cheese has substantially no amylose therein. The amylopectin and amylose from the modified starch are in a form and in a ratio in the final processed cheese effective to provide substantially no texture or flavor to the processed cheese.

In another aspect, a method of preparing an emulsifying salt-free processed cheese is provided herein. In one approach, the method includes first heating a blend of water and a modified starch containing amylopectin and substantially no amylose to its gelatinization temperature to form a cooked starch paste. Then, the cooked starch paste is blended with natural cheese or a mixture of natural cheeses with water to form a cheese mixture. In one approach, the cheese mixture contains about 0.5 weight percent or less of emulsifying salts so that the cheese mixture does not contain significant levels of emulsifying salts. Next, the cheese mixture is heated to form the emulsifying salt-free processed cheese. In one approach, the amount of modified starch containing amylopectin and substantially no amylose is effective in the method such that a viscosity of the cheese mixture decreases about 50,000 cps to about 60,000 cps during heating to form the processed cheese having a uniform distribution of amylopectin with substantially no intact starch granules and substantially no starch agglomerates. The final processed cheese also has less than about 0.1 percent amylose so that the processed cheese has substantially no amylose in the processed cheese. The amylopectin and amylose are in a form and in a ratio effective to provide substantially no texture or flavor to the processed cheese.

As discussed in more detail below, the processed cheese and methods of forming processed cheese herein including no or substantially no emulsifying salts use certain modified starches that are effective to provide viscosity and water management during cooking to aid in the functionalization of the dairy proteins and to aid in managing the fat within the cheese mixture during the cheese cooking process. Then, the starches decrease in their functional contribution to the cheese mixture so that in the final processed cheese, the starch provides no textural, flavor, or other organoleptic contribution to the product.

BRIEF DESCRIPTION OF THE DRAWING

FIGS. 5A to 5D are micrographs of erythorbic acid impregnated waxy corn starch in various cheese sauce processing stages.

DETAILED DESCRIPTION

Figure 1A:
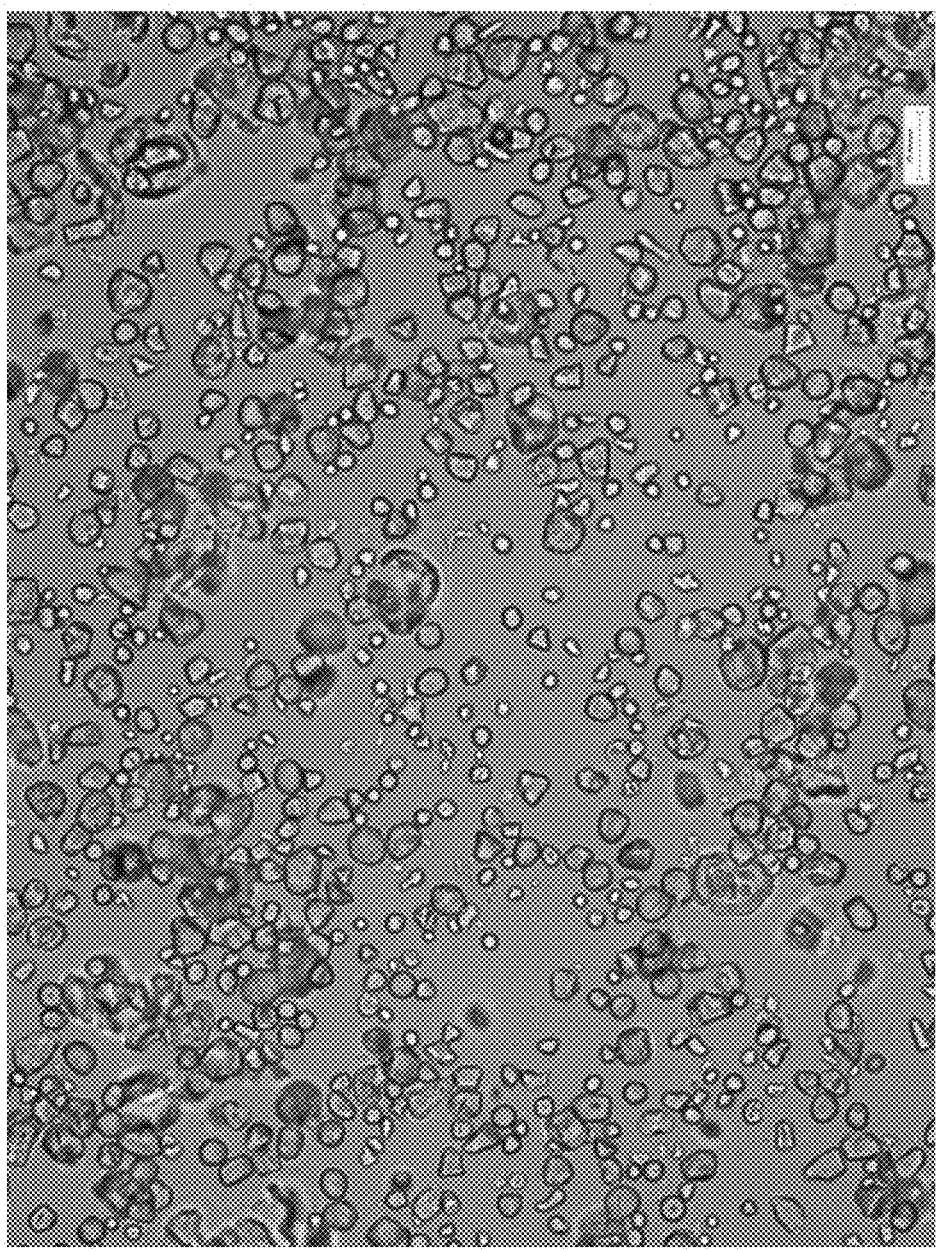
FIGS. 1A-1G are micrographs of native corn starch granules in various cheese sauce processing stages.

Emulsifying salt-free cheese products and processed cheese as well as methods of preparing emulsifying salt-free cheese products and processed cheese are provided. In one approach, the emulsifying salt-free cheese products herein include high moisture cheese systems (about 30 percent to about 80 percent moisture) that tend to not react favorably to the prior approaches used to eliminate emulsifying salts. Because certain cheese products, such as sauces and spreads, may be high in moisture, the prior approaches are undesired because they use components that build texture in the final product. In other approaches, the emulsifying salt-free cheese products provided herein include, for example, more solid forms of processed cheese including cheese slices, shreds, cheese snacking sticks, loafs, bricks, and the like, and may be applied in any type of emulsifying salt-free processed cheese that may benefit from the reduction in emulsifying salts. In some approaches, the processed cheeses herein may be provided as a cheese component or cheese sauce component in food, snack, and/or other types of meal kits.

In one aspect, the emulsifying salt-free cheese products herein include a natural cheese or a mixture of natural cheeses providing dairy protein, water, and include effective amounts of a modified starch selected to provide amylopectin and substantially no amylose to form a processed cheese without significant levels of emulsifying salts. The use of such modified starch systems in cheese is advantageous because the starch is effective to build viscosity and provide water management during high temperature processing, yet is operable to degrade to yield a processed cheese that does not have intact starch or starch granules to build texture in the final product. As discussed more herein, the select modified starches effectively provide a uniform distribution of amylopectin with substantially no intact starch granules and substantially no starch aggregation or agglomerates in the final cheese product. The starches also provide no or substantially no amylose. Thus, the processed cheese includes effective ratios of uniformly distributed amylopectin to amylose to provide no texture or flavor to the final processed cheeses. The processed cheese and cheese products described herein are resistant to separating during heating and retain desirable organoleptic properties, such as a smooth texture and intense cheese flavor, without the use of conventional emulsifying salts or starches.

Some of the challenges involved in reducing emulsifying salts in cheese products include instability during and after processing. To remedy the stability issues that result from reducing the level of emulsifying salts, hydrocolloids and starches have previously been used to provide stability during cheese production as discussed in the background. However, the use of hydrocolloids and starches in processed cheese products have the disadvantage of inhibiting flavor release and yielding undesirable texture and eating quality because the hydrocolloids and starches build texture and viscosity in the final product, which is generally undesired in some types of cheeses, such as high moisture processed cheese products. In other types of cheeses, the starches, hydrocolloids, and other gums were commonly used because such ingredients were capable of providing function and texture to the final product. Thus, it was commonly desired in some prior approaches that the starch retain functionality and some degree of integrity in the final product. The present approach, herein, is just the opposite. The starches provide functionality during processing, but essentially disappear with respect to their functionality in the final product.

Without wishing to be bound by any particular theory, it is believed that where the cheese mixture is at its most unstable, the selected modified starch granules are imbibing water and swelling, and managing the viscosity of the cheese mixture to provide in-process stability. As the process continues, starch granules are ruptured from shear, action of acids, or enzymes, decreasing the viscosity contribution from the starch. At the time the viscosity contribution of the starch begins to decrease, the cheese mixture has stabilized itself adequately to manage fat, and relies less on the viscosity contribution of the starch to provide stability. In the case of granular starches, the loss in viscosity is believed to be associated with the loss of starch granule integrity. The rupturing of the starch granules at or near the conclusion of the cooking process yields a finished product without the aforementioned product defects. In some approaches, it is believed that such functionality of the cheese may also relate to select levels of amylopectin and amylose in the starch and starch granule that are effective to quickly shear degrade.

As used herein, the discussion of an ingredient, such as emulsifying salts, being absent from, not in significant levels, not present, having substantially no, not included in, and/or present in essentially no amounts in the cheese generally means that the ingredient is present at about 0.5 percent or less, in other approaches, about 0.1 percent or less, in yet other approaches, about 0.05 percent or less, and in some cases not present at all.

Turning to more of the specifics, the present disclosure provides an emulsifying salt-free cheese product or process cheese product which includes a blend of ingredients having effective amounts of modified starch to sufficiently overcome the absence of emulsifying salts, yet without providing undesirable texture, flavors, or other organoleptic characteristics in the final product. In one approach, the emulsifying salt-free processed cheese includes a natural cheese or a mixture of natural cheeses providing from about 5 weight percent to about 95 weight percent dairy protein. The cheese may include up to about 80 percent water and, in some approaches, may be about 30 percent to about 60 percent water for sticks, slices, shreds, loaves, and bricks of cheese and, in other approaches, may be about 40 percent to about 80 percent water for sauce and spread types of cheese. The processed cheese includes about 0.1 weight percent to about 10 weight percent of modified starch containing amylopectin and substantially no amylose. The modified starch is effective to provide a uniform distribution of the amylopectin in the final processed cheese with substantially no intact starch granules and substantially no starch agglomerates with less than, in some approaches, about 0.1 percent amylose so that the processed cheese has substantially no amylose therein. In yet other approaches, the amylopectin and amylose from the modified starch are selected to be in a form and in a ratio within the final processed cheese effective to provide substantially no texture or flavor to the processed cheese.

Suitable starches may include any modified starches treated to provide the desired processing functionality of viscosity and water management during cooking, yet disappear functionally in the final product as discussed above with the unique distribution of amylopectin and amylose. The modified starch may be derived from any suitable starch source, such as corn, wheat, potato, tapioca, waxy maize, sago, rice, and the like. In one approach, the starch may be derived from waxy starches, such as waxy maize, waxy rice, and waxy sorghum, or root starches such as potato, sweet potato, yams, taro and arrow root. Any suitable modified starch or combinations thereof may be used. The modified starch may be an instant starch, or a pre-cooked starch paste. The pre-cooked starch paste may undergo additional processing, such as shear, prior to being combined with a cheese mixture.

In one approach, the modified starch may be substituted starches. The modified substituted starch may be lightly substituted, such as to a degree of substitution less than about 0.2 D.S., or from about 0.1 to about 0.2 DS., or in some cases less than about 0.1 D.S. The degree of substitution may be such that the starch does not need to be cross-linked during the modification process. Substitution may lower gelatinization temperature, resulting in a starch with a tendency to develop viscosity earlier in the heating process compared to the unmodified parent starch, starches with other modifications such as cross-linking, or starches with higher gelatinization temperatures. In some approaches herein, the modified starches may have a gelatinization temperature of about 65'C to about 75° C. The lightly substituted starch is less resistant to shear, such that the starch granule may be degraded or ruptured by the application of shear. In some approaches, the starch granules tend to be substantially ruptured and only a few or substantially only a few intact and swollen starch granules remain intact in a cooked paste or slurry of the starch. In one aspect, the starch may be a mono-substituted waxy corn starch having one hydroxypropyl group substituted for hydrogen in the starch to form a starch ester.

Suitable natural cheeses for use in the emulsifying salt-free cheese product and processed cheeses herein may be pasteurized or unpasteurized cheese made by curdling milk by some combination of rennet, rennet substitutes, and acidification. The milk may be unfiltered or filtered, such ultrafiltered milk. The natural cheese used in the present disclosure may be freshly made or aged. Natural cheese types may include, for example, cheddar, gouda, mozzarella, provolone, brie, and any other suitable natural cheese for use in a cheese sauce. A mixture of two or more natural cheeses may be selected to provide the desired flavor profile of the emulsifying salt-free cheese product. The natural cheese includes casein and essentially no whey. The casein is generally non-calcium reduced casein and tends to include about 200 to about 350 ppm of calcium per percent of casein and, in some approaches, about 300 to about 350 ppm of calcium per percent of casein.

In one approach, the emulsifying salt-free cheese product comprises natural cheese or a mixture of natural cheeses in an amount of about 5 percent to about 95 percent, such as about 50 percent to about 70 percent. In another approach, the natural cheese or mixture of natural cheeses is present in an amount of about 60 percent to about 65 percent. In yet another approach, the natural cheese is cheddar cheese in an amount of about 60 percent to about 65 percent.

Higher moisture cheese systems, such as systems containing about 30 percent moisture or higher, tends to be more unstable during processing when prepared without emulsifying salts, and without decreasing the protein levels such as by using a calcium reduced casein source. Such high moisture cheese systems are typically prone to separation. By one approach, the emulsifying salt-free cheese product and processed cheeses herein include about 30 percent to about 80 percent moisture when the final product is a cheese sauce or spread. Moisture may be added to the blend by any method, such as, but not limited to, injecting steam into the cooker (e.g. a laydown cooker), comingling of condensed steam from cooking, and/or direct addition of water to components of the emulsifying salt-free cheese sauce during processing. For example, moisture can enter the system though the various ingredients (e.g. moisture from the natural cheese) or by direct addition to the cheese mixture, or by preparation of a starch slurry which is then combined with the cheese.

The dairy protein may be present in the emulsifying salt-free cheese product in an amount of at least about 5 percent, such as about 5 percent to about 30 percent, and in some approaches, from about 12 percent to about 30 percent, such as about 15 percent to about 20 percent. The amount of dairy protein level in the emulsifying salt-free cheese product may vary depending on the type of cheese product. For example, in firmer type cheese products such as cheese slices or snacking sticks, the dairy protein may be present in an amount of about 15 percent to about 25 percent, such as about 15 percent to about 20 percent. Without wishing to be bound to any particular theory, it is believed that the firmness of the finished product depends on the level of intact casein available. In lower viscosity cheese products such as sauces and spreads, the amount of dairy protein may be present in an amount of about 5 percent to about 15 percent, such as about 10 percent to about 14 percent, or about 13 percent. The dairy protein in the emulsifying salt-free cheese product may be provided by the natural cheese or the mixture of natural cheeses. The dairy proteins in the natural cheese can include caseins or caseinates, and in some cases, by limited amounts of whey proteins.

In another aspect, the emulsifying salt-free cheese product further includes some hydrocolloid stabilizers, but less than about 0.5 percent hydrocolloid stabilizers. Higher amounts of hydrocolloids may inhibit flavor release and yield undesirable texture and eating quality. Hydrocolloid stabilizers include natural and modified gums. Natural gums may include agar-agar, carrageenan, gelatin, guar gum, gum arabic, xanthan gum, pectin, and the like. Modified gums may include cellulose derivatives such as carboxymethyl cellulose, sodium alginate, and the like.

The modified starches and unique cheese blends herein are effective to form cheese without emulsifying salts because the blends and starches are effective to provide immediate viscosity and water management to help aid in decreasing fat separation, and in reducing protein aggregation during processing, but then effectively disappear in functional effect in the final product. In some approaches, the modified starch has select amounts of amylopectin and amylose and provides a uniform distribution of the amylopectin in the final processed cheese with substantially no intact starch granules and substantially no starch agglomerates, and with less than about 0.1 percent amylose so that the processed cheese has substantially no amylose therein. Thus, the amylopectin and amylose levels from the modified starch are in a form and in a ratio effective to provide substantially no texture or flavor to the processed cheese.

In one approach, the modified starch is effective to provide less than about 50 intact starch granules, in other approaches less than about 10 intact starch granules of amylopectin per about 900 mm$^2$ of processed cheese as determined by Lugol's iodine stain at about 20× magnification such that there are substantially no intact starch granules of amylopectin in the processed cheese. In yet other approaches the final cheese product has substantially no intact starch granules. As appreciated by those of ordinary skill, Lugol's iodine stain or solution provides an easily identifiable method of measuring starch granules as they appear as defined dark spots under magnification. In yet other approaches, the processed cheese contains no intact starch granules, no starch agglomerates, and no amylose.

In other approaches, it is believed that select ratios of the amylopectin to amylose provided by the modified starch are effective in achieving the unique processing and final textural and flavor characteristics discovered herein. For instance and in yet one approach, the processed cheese has a ratio of amylopectin to amylose from about 20 to about 200, in other approaches, about 20 to about 100, and in yet other approaches, about 50 to about 100. In some approaches, processed cheese has no amylose at all.

In another aspect of the processed cheeses herein, the amylopectin is uniformly distributed in the final cheese product. Thus, the amylopectin is not agglomerated, aggregated, or pooled in various portions of the cheese, but rather uniformly or consistently blended in or throughout the cheese. As shown in the Examples below, this can easily be identified via a Lugol's stain analysis where agglomerated or aggregated amylopectin tends to be visible as bands of discrete rust colored portions in the cheese.

Turning now to the method of manufacturing the emulsifying salt-free cheese products and processed cheeses of the present disclosure. By one approach, the cheese may be produced by blending together natural cheese or a mixture of natural cheeses, moisture, and the pre-gelatinized modified starch. The ingredients may be blended together and heated, such as to temperatures of about 60° C. (140° F.) to about 145° C. (293° F.). Emulsifying salts are not added to the blend. Optionally, shear may be applied during or after the heating. The resulting cheese product is generally homogenous, shows no signs of separation (i.e., "watering off," "oiling off," and/or protein sedimentation) during heating, and has a smooth texture.

In one approach, the emulsifying salt-free cheese product is prepared by blending a natural cheese or a mixture of natural cheeses with water to form a natural cheese mixture. The modified starch may be added directly to the natural cheese mixture to form a cheese mixture. By another approach, the modified starch is first blended with an amount of water to form a starch slurry, which is heated to the gelatinization temperature of the starch to form a starch paste, and then combined with the natural cheese mixture to form a cheese mixture. Thus, the starch is pre-gelatinized and/or at its highest viscosity upon being added to the other cheese ingredients.

To prepare the modified starch slurry, the modified starch and water are first combined to form an initial starch slurry. In one approach, a starch slurry of about 10 percent to about 30 percent (w/w), such as about 20 percent (w/w), may be initially prepared. The starch slurry may then be pre-cooked to form a starch paste. The starch paste may be formed by heating the starch slurry via direct steam injection at temperatures of between about 65° C. to about 75'C, such as about 74° C. (165° F.) for between about 5 seconds to about 60 seconds. The starch slurry may be pre-cooked by any suitable method, such as via a direct steam injection, or any other method known to one skilled in the art.

The natural cheese mixture is prepared by blending a natural cheese or a mixture of natural cheeses with water. In one approach, the natural cheese mixture may comprise about 5 percent to about 95 percent cheese, and provide dairy protein of about 5 percent to about 30 percent. The natural cheese mixture may be prepared by blending the ingredients of the natural cheese mixture in a laydown cooker at temperatures of about 60° C. to about 145° C.

The pre-cooked modified starch paste and the natural cheese mixture is then combined to form a cheese mixture. In one approach, the amount of water in the cheese mixture is about 30 percent to about 80 percent water. Moisture in the cheese mixture may be from steam injected into the cooker (e.g. such as in a laydown cooker), comingling of condensed steam from cooking, and/or direct addition of water to components of the cheese mixture, such as from the starch paste or from the natural cheese mixture.

The cheese mixture is heated in a process cheese cooker to a temperature of between about 45° C. (113° F.) to about 145° C. (293° F.), such as a temperature of at least 160° F. (71° C.) for between about two minutes to about 10 minutes in accordance with conventional processed cheese preparation methods known to one skilled in the art. The cheese mixture may be agitated by an auger or other agitation methods during the cooking process.

In one approach, the starch and cheese forms an emulsifying salt-free cheese sauce or spread with a viscosity of about 5500 cps to about 8500 cps at a temperature of about 65° C. to about 75° C.

In another approach, a lightly substituted starch may be used to prepare the emulsifying salt-free cheese product. Without wishing to be bound by any particular theory, it is believed that the cheese and starch processing conditions, such as the agitation of the cheese mixture during cooking and/or the temperature of the cooker may rupture the starch granule, and gradually erode the starch granule to decrease the viscosity of the cheese mixture contributed by the starch. In one approach, the viscosity change in a cheese sauce preparation using a lightly substituted starch may be between about a ten-fold to an eleven-fold decrease in viscosity.

The emulsifying salt-free cheese product of the present disclosure includes cheese sauces or spreads, cheese slices, cheese shreds, cheese snacking sticks, and cheese components in meal kits, and any other emulsifying salt-free cheese products.

The emulsifying salt-free cheese product may be subjected to an optional, high shear process after the initial heating and/or pasteurization. It is believed that this additional high shear step decreases the size of the fat globules within the cheese mixture to finer fat globules which are more evenly distributed within the cheese mixture. This homogenization step tends to create better mixing at microscopic levels, and results in an enhanced smoothness, creaminess, and stability. The high shear may be applied with a rotor stator shear device, homogenizer, or any other shear device known to one skilled in the art.

The emulsifying salt-free cheese product described herein may contain additional ingredients so long as the additional ingredients do not adversely affect the properties of the resulting cheese product. Examples of such additives include, but are not limited to colorants, flavorants, antimicrobial agents, preservatives, other milk components, and the like. Other optional ingredients may be added to improve texture, flavor, nutrition, and/or cost attributes. Sodium chloride may be optionally added for flavor. Other flavorants or flavoring agents may include natural flavors, powdered or liquid seasonings, jalapeno peppers, flavored cheeses, or any suitable additional ingredients which impart flavor to the cheese product. These flavoring ingredients may be used in amounts up to about 15 percent. Anti-microbial agents such as sorbic acid may also be added. Anti-microbial agents may be added in an amount of between about 0.03 percent to about 10 percent. Milk components may include dairy powders such as whey derived ingredients (e.g. whey protein concentrate), skim milk powder, non-fat dry milk, milk protein concentrate, and anhydrous milk fat. The dairy powders may be added in an amount up to about 10 percent.

A better understanding of the present embodiment and its many advantages may be clarified with the following comparative examples. The following examples are illustrative and not limiting thereof in either scope or spirit. Those skilled in the art will readily understand that variations of the components, methods, steps, and devices described in these examples can be used. Unless noted otherwise, all percentages and parts noted in this disclosure are by weight.

EXAMPLES

Comparative Example 1

A cheese sauce was prepared using the ingredients and in the amounts shown in Table 1 below. Native corn starch (Pure Food Powder from Tate & Lyle, Inc., Decatur, IL) and enough water to prepare a starch slurry of about 20% (w/w) were combined to form a starch paste by pre-cooking the starch slurry via direct steam injection at 165° F. The remaining ingredients, including the remaining water not used to prepare the starch slurry, were blended to form a natural cheese mixture. The starch paste was combined with the natural cheese mixture in a laydown cooker to form a cheese mixture. The cheese mixture was heated under agitation to about 162° F. and held for about 60 seconds.

TABLE 1

| Ingredients | % wt |
| --- | --- |
| Natural Cheddar Cheese | 64.0 |
| Sodium Chloride | 0.9 |

TABLE 1-continued

| Ingredients | % wt |
| --- | --- |
| Acid | 0.05 |
| Color Additive | 0.07 |
| Native Corn Starch | 1.0 |
| Water | 34.0 |

The resulting cheese sauce exhibited non-optimal gummy textures and had off-flavors such as a corn chip-like off flavor, and a muted cheddar flavor. Without wishing to be limited by theory, it is believed that the native corn starch includes both amylopectin and amylose. As further shown below, the presence of amylose in the final cheese results in undesired textures and flavors.

Example 1

A cheese sauce was prepared using the ingredients and in the amounts shown in Table 2 below. Rather than the native corn starch of Example 1, a lightly substituted waxy corn starch (Shur-FIL® 677 from Tate & Lyle, Inc., Decatur, IL) and enough water to prepare a starch slurry of about 20% (w/w) were combined to form a starch slurry, pre-cooked to form a starch paste, and combined with the natural cheese mixture as described in Comparative Example 1.

TABLE 2

| Ingredients | % wt |
| --- | --- |
| Natural Cheddar Cheese | 62.6 |
| Sodium Chloride | 0.9 |
| Acid | 0.05 |
| Color Additive | 0.07 |
| Shur-FIL ® 677 (lightly substituted, waxy corn starch) | 2.0 |
| Water | 34.4 |

The resulting cheese sauce exhibited a non-gummy, viscous cheese with an intense cheddar cheese flavor, without off-flavors such as the corn-chip off-flavor. The modified starch includes amylopectin and essentially no amylose.

Comparative Example 2

Micrographs depicting the stepwise degradation of native corn starch during the cooking process for a cheese sauce were prepared to show how native corn starch degrades during cooking. These images are provided in FIGS. 1A-1G, where the scale in each of the figures is about 25 µm.

Figure 1B:
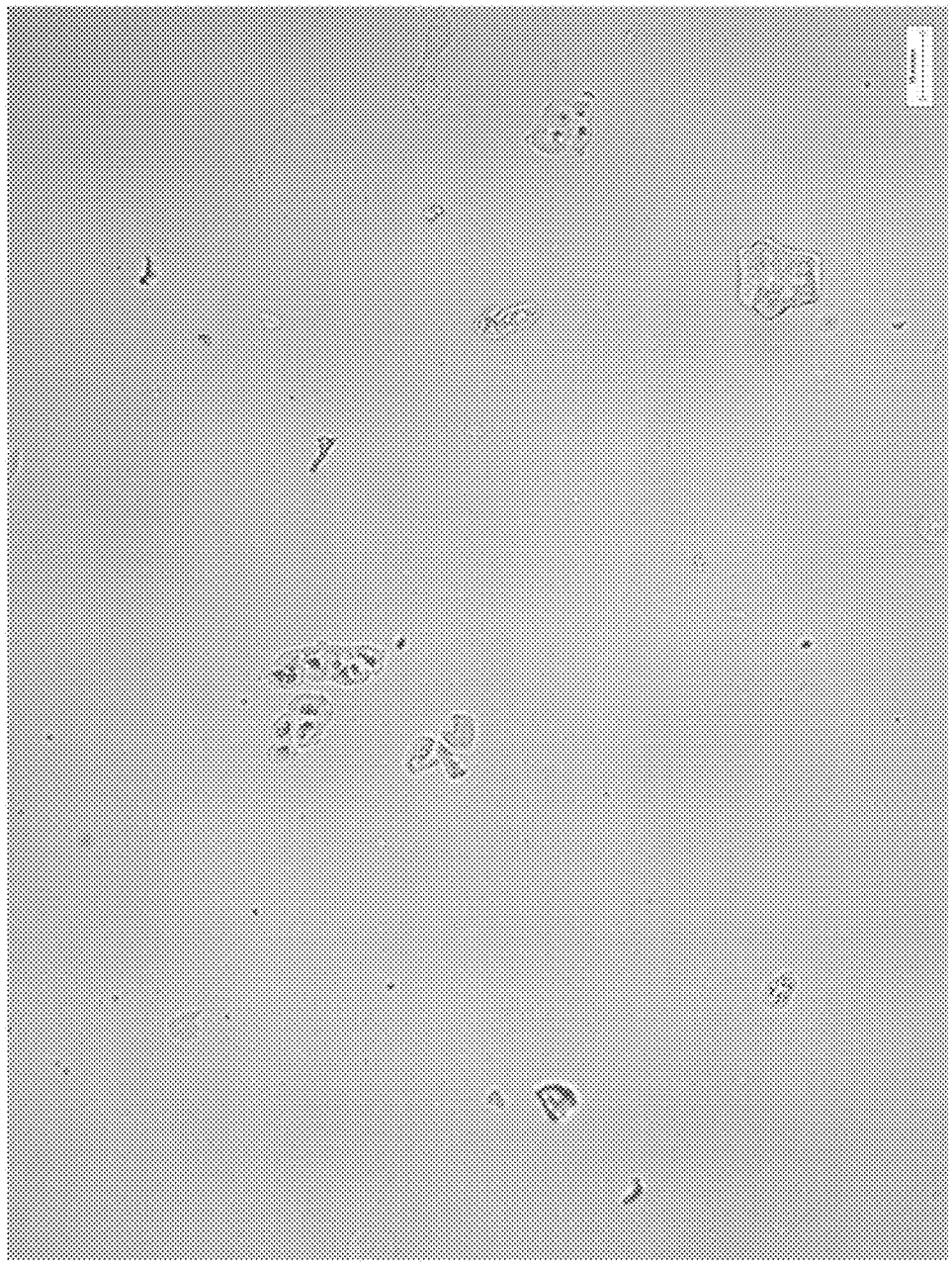

For this investigation, about a 30% (w/w) starch slurry of native corn starch was prepared by combining native corn starch and water, Lugol's stain was used to visually analyze the presence of the starch. FIG. 1A is a view of the non-gelatinized starch granules in the starch slurry viewed under a Brightfield microscope. Then, the starch slurry of FIG. 1B was heated to prepare a starch paste of gelatinized starch. Once the starch granules have absorbed water, distinct granules are no longer visible under Brightfield microscopy. FIG. 1B is a Brightfield microscope view of the cooked starch slurry with few uncooked starch granules visible. A majority of the starch granules of FIG. 1A are no longer visible, indicating that these starch granules have gelatinized.

The starch paste of FIG. 1B was then combined with natural cheese in a cooker to form a cheese mixture. The cheese mixture is cooked to a temperature of about 162° F., with samples of the cheese mixture obtained just when the starch paste is added to the cheese, and at about 2 minutes (about 120° F.), about 4 minutes (about 140° F.), and about 6 minutes (about 162° F.) intervals during the cooking process, as well as after a final high shear step. Lugol's iodine stain was applied to each of the samples to stain the starch granules. Native corn starch granules under Lugol's iodine stain appear dark blue/black or purple in color. The native corn starch granules in FIGS. 1C to 1G are indicated by the arrow in each of the Figures.

Figure 1C:
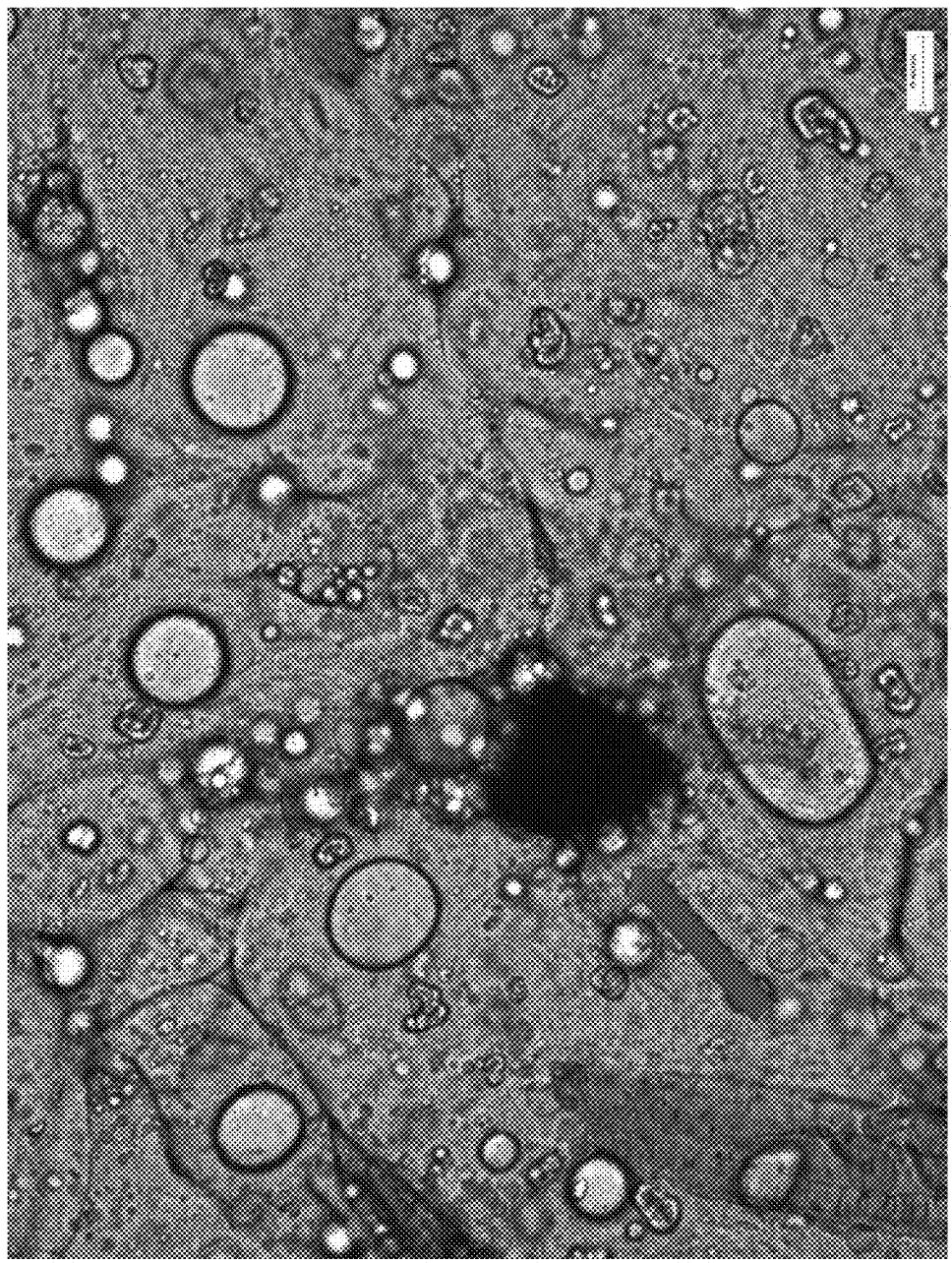
Figure 1D:
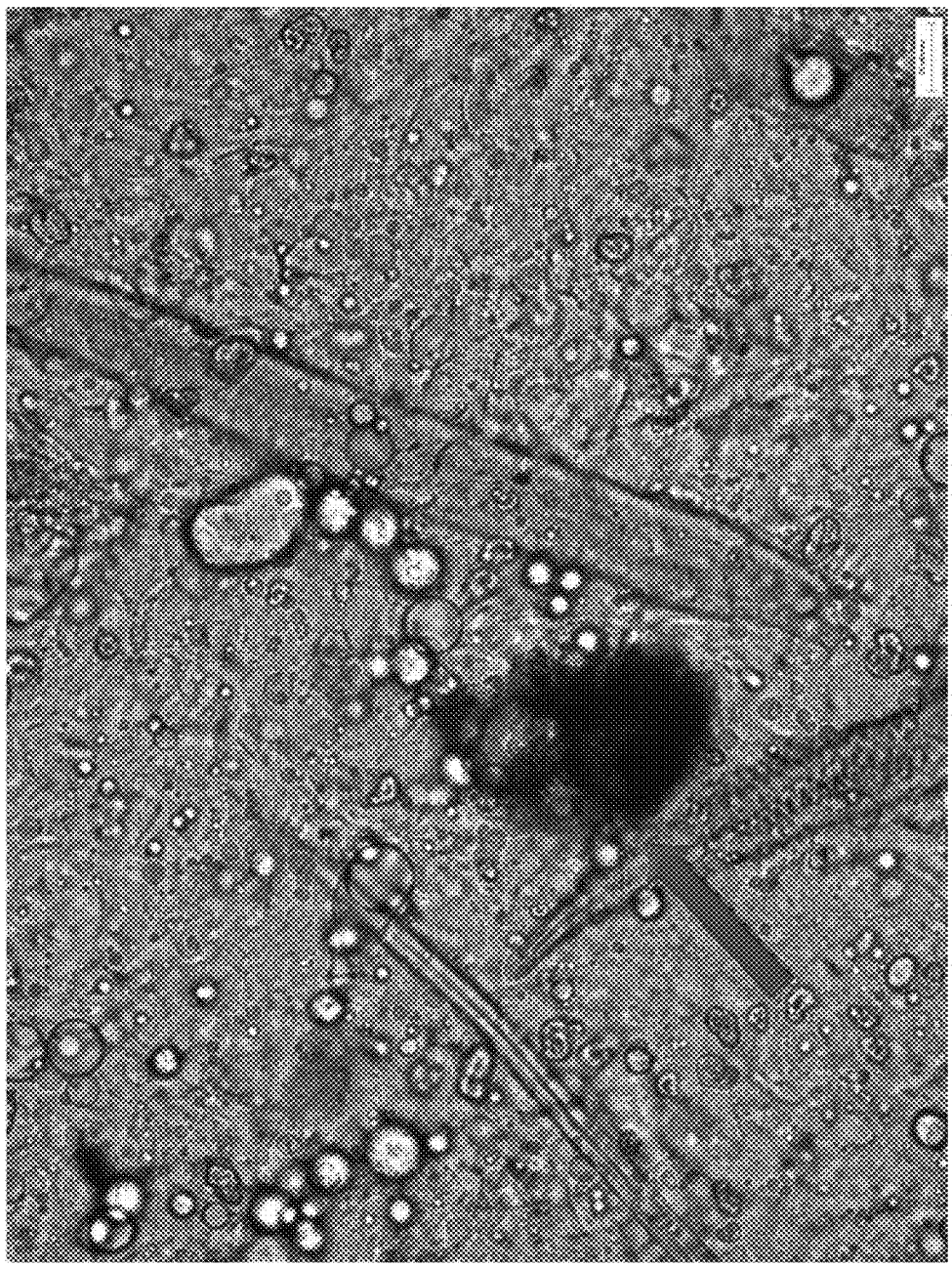
Figure 1E:
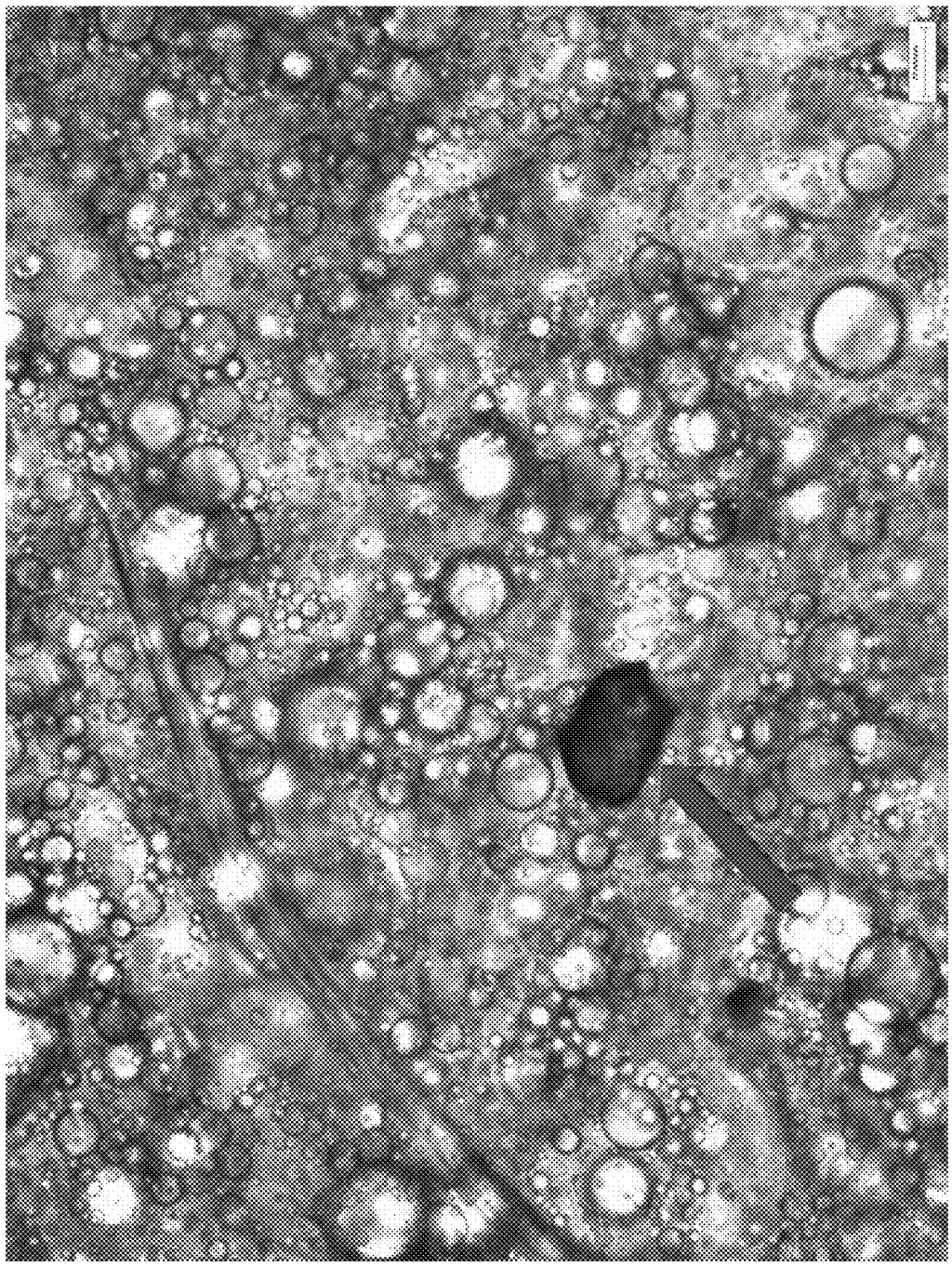
Figure 1F:
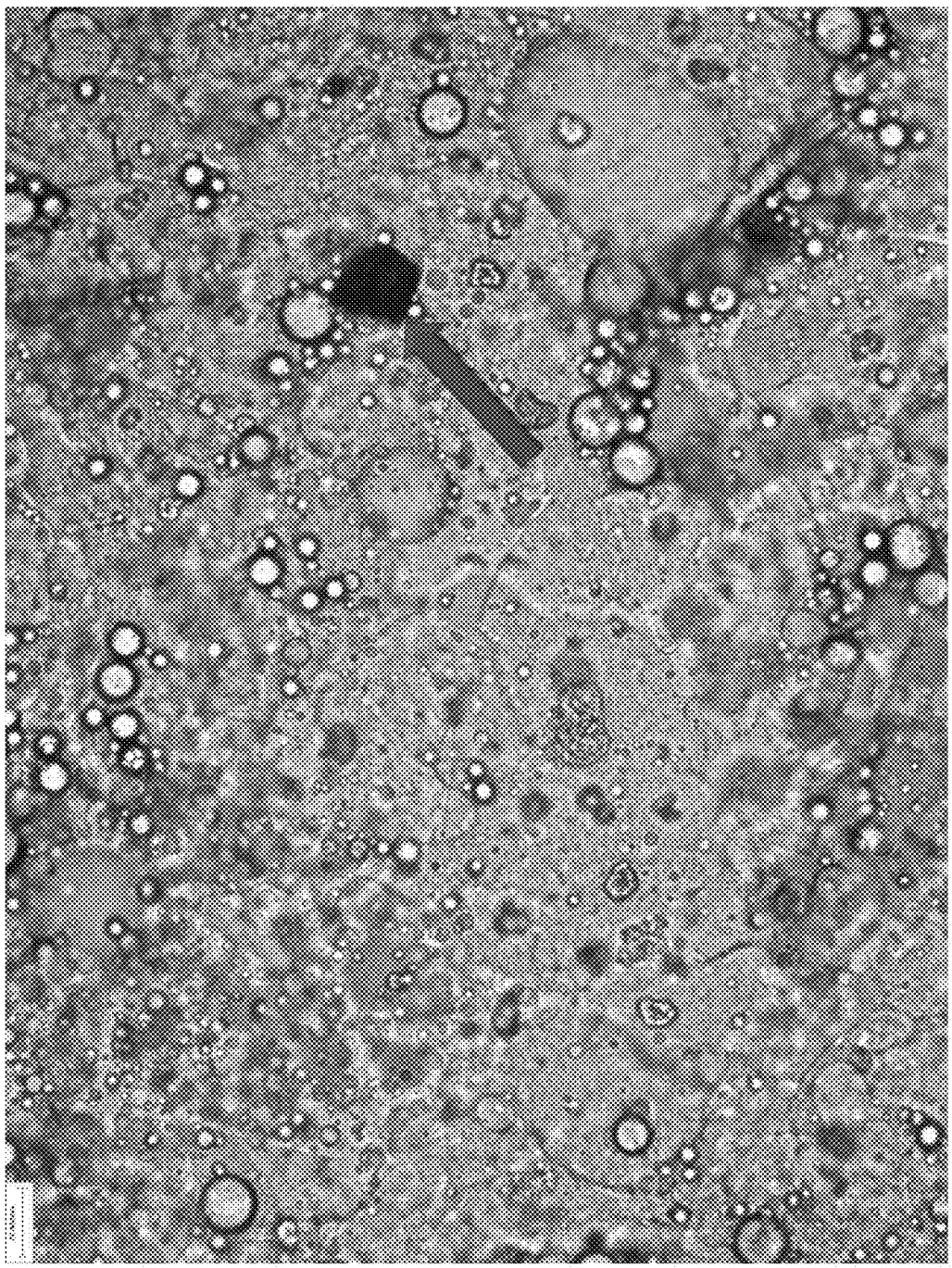

FIG. 1C illustrates the size of the native corn starch just when the starch paste has been combined with the cheese mixture. FIGS. 1D-1F illustrate the degradation of the native corn starch during the cooking process at t=2 minutes (120° F.), t=4 minutes (140° F.), t=6 minutes (160° F.), respectively.

Figure 1G:
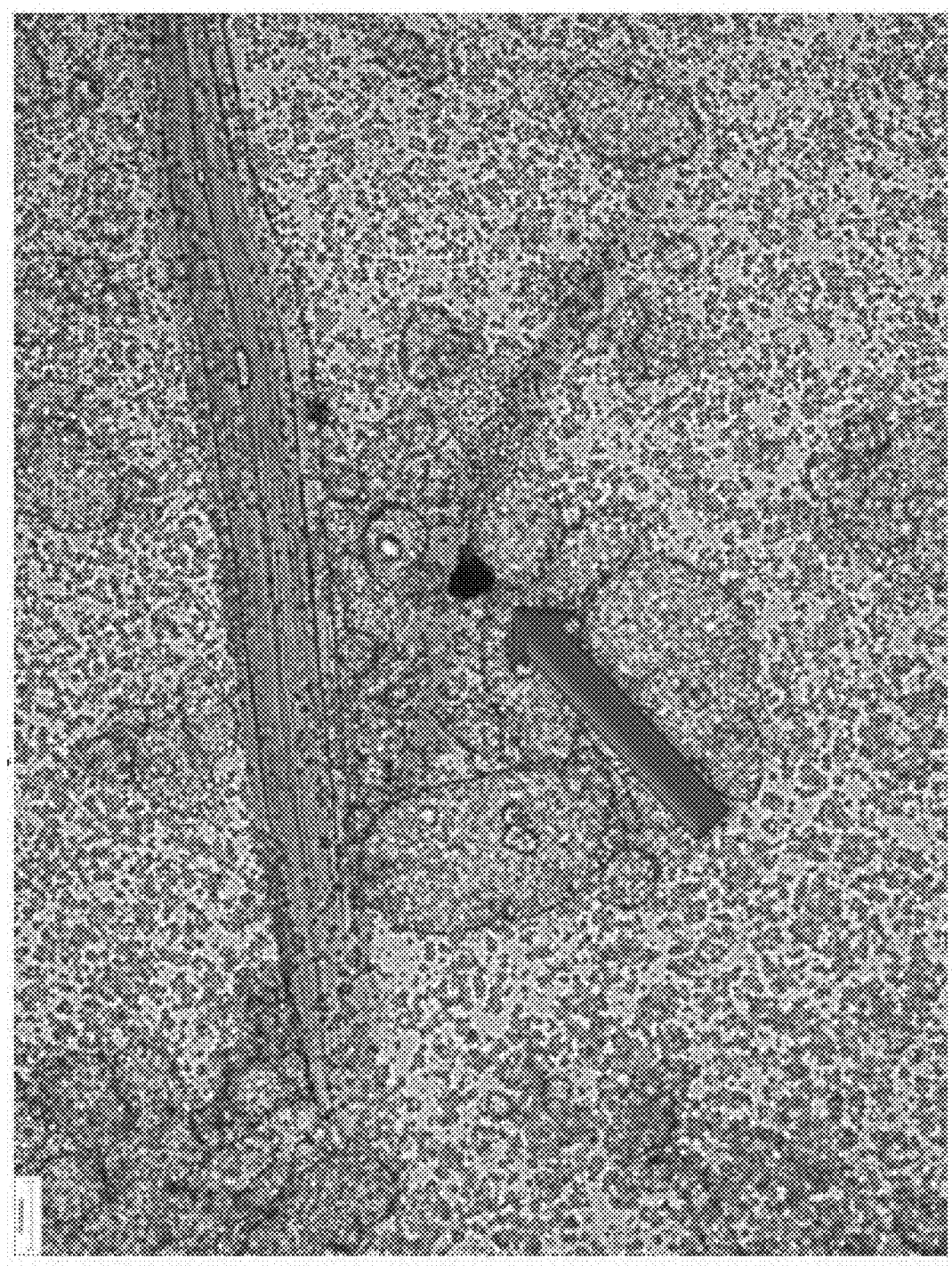

After heating the cheese mixture to about 162° F., the cheese mixture is subjected to a final high shear processing step using a Dispax rotor at 60 Hz. While the cheese mixture is stable upon completion of the heating step to 162° F., the optional final high shear provides additional stability by distributing the fat globules within the cheese mixture. FIG. 1G is a micrograph showing the size of the native corn starch after a final high shear step. As seen in the micrographs of FIGS. 1C to 1G, the native corn starch degrades during the cooking process and the final shear step, but tends to still be present in the final processed cheese. Moreover, the native corn starch also includes high levels of amylose, which is undesired from a textural and flavor standpoint.

Example 3

This Example compares the starch pasting or gelatinization profiles of the starches identified in Table 3 below. The pasting or gelatinization profiles for the starches in Table 3 were generated using a 2Standard2 testing profile available using a Rapid Visco™ Analyzer from Newport Scientific Pty Ltd, Australia. Starches were run at about 8% w/w basis in water. Results are shown in the graph of FIG. 2.

TABLE 3

| Starch Type | Starch Type |
| --- | --- |
| A-Example of Inventive Modified Starch | Shur-FILP ® 677 (lightly substituted waxy corn starch, Tate & Lyle, Inc., Decatur, IL) |
| B | NATIONAL ® 150 (erythorbic acid impregnated waxy corn starch, National Starch, Bridgewater, NJ) |
| C-Comparative | Amioca (native waxy corn starch, National Starch, Bridgewater, NJ) |
| D-Comparative | Pure Food Powder (native corn starch, Tate & Lyle, Decatur, IL) |

Figure 2:
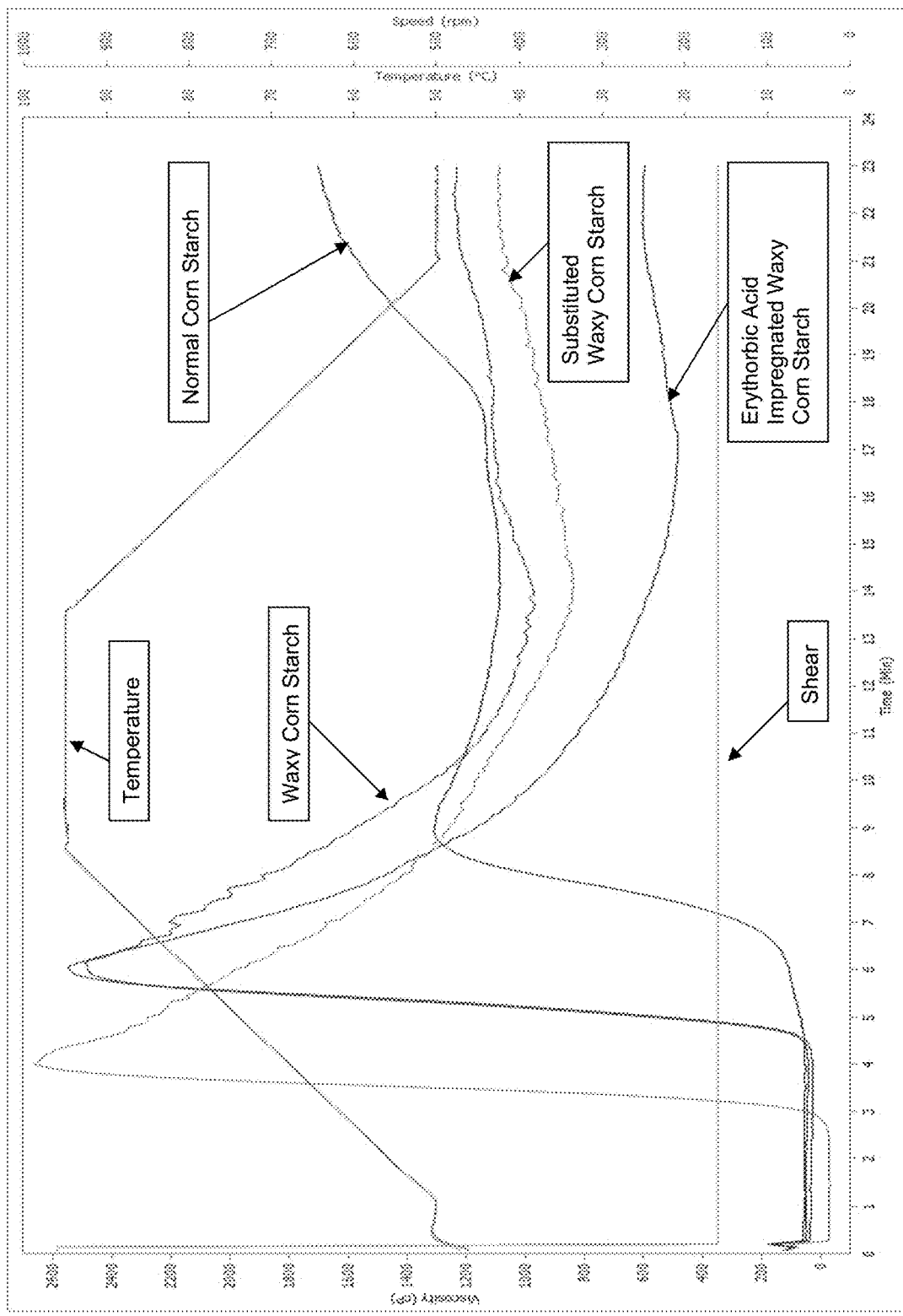
FIG. 2 is a starch pasting profile comparison of various starch types.

As seen in FIG. 2, Starch A gelatinizes and develops viscosity earlier than the other waxy corn starches. Inventive Starch A has a final viscosity lower than other waxy corn starches, such as Comparative Starch C, indicating more complete starch granule breakdown in the final product. Starch B has a gelatinization temperature and viscosity development similar to Comparative Starch C, but yielded a lower final viscosity indicating a loss of starch granule integrity. Comparative Starch D provides late development in gelatinization and low viscosity development compared to the other starches.

Example 4

This Example compares the viscosity profile of a cheese mixture containing each of the starches in Table 3, during the cooking process from about 120° F. to about 162° F., and in the final high shear step. Each of the starches in Table 3 were heated to their peak gelatinization as indicated by a cooker viscometer, and combined with natural cheese to form a cheese mixture for cheese sauce. The viscosity at temperature increments of about 120° F., about 140° F., about 162° F., and after the final high shear step was measured. Each cheese mixture was prepared in accordance with Table 4 below.

TABLE 4

| Ingredients | % wt |
| --- | --- |
| Natural Cheddar Cheese | 56.9 |
| Cultured Milk | 6.0 |
| Starch | 2.0 |
| Water | 32.7 |
| Acid | 0.2 |
| Color Additive | 0.05 |
| Salt | 1.2 |
| Oat Fiber (texture ingredient) | 1.0 |

Figure 3:
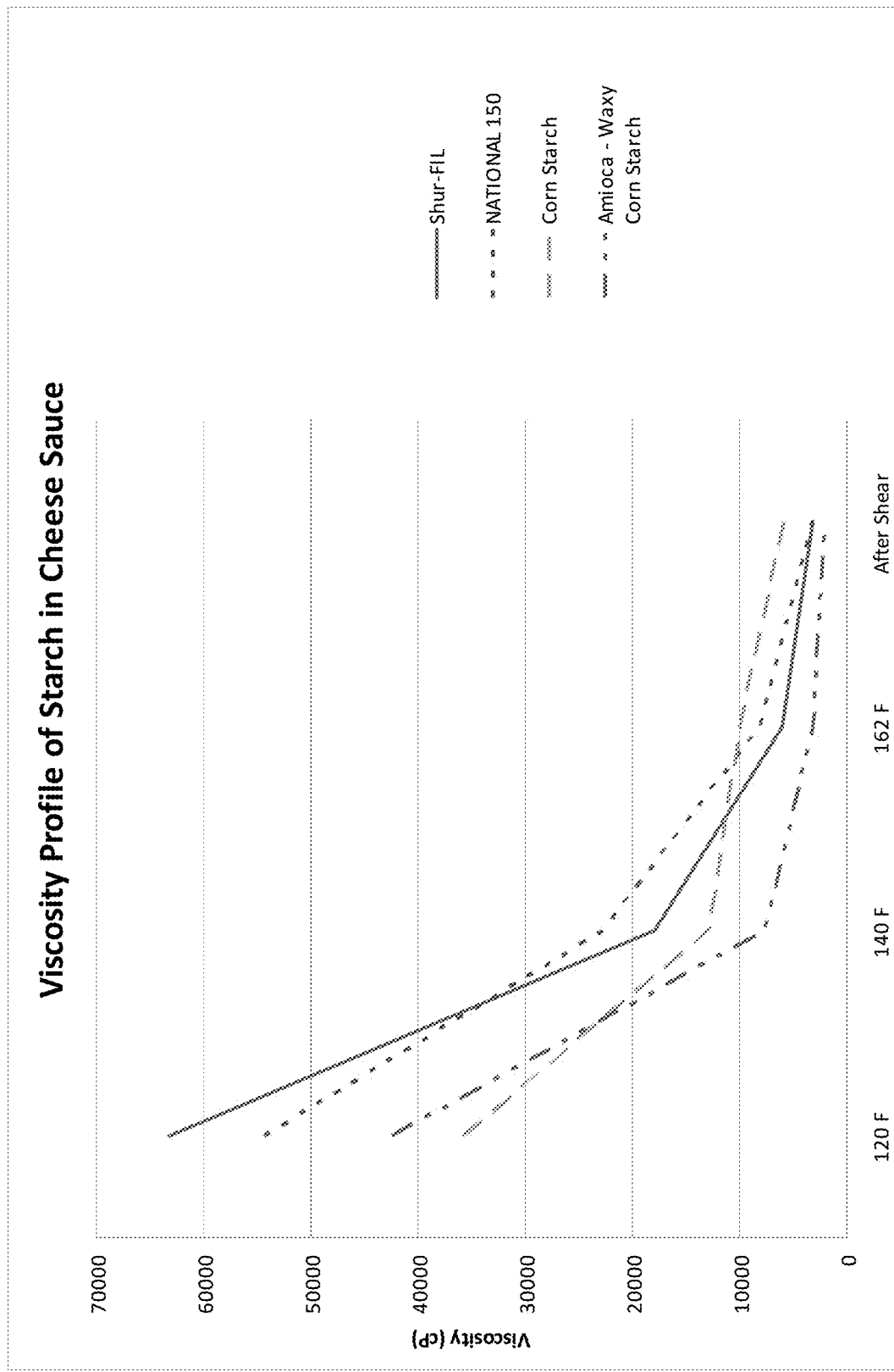
FIG. 3 compares the viscosity of cheese sauce prepared with various starch types at different cheese sauce processing stages.

Viscosity measurement results for cheese sauces containing each of the starches are shown in FIG. 3. Table 5 below provides the viscosity of the cheese sauces prepared with each starch type at the sample points.

TABLE 5

| | Viscosity (cps) | | | |
| --- | --- | --- | --- | --- |
| Starch in the Cheese Sauce | 120° F. | 140° F. | 162° F. | After Shear |
| A | 63200 | 18000 | 6000 | 3120 |
| B | 54300 | 22720 | 8080 | 3227 |
| C | 42400 | 7680 | 3234 | 2085 |
| D | 35680 | 12880 | 10000 | 5840 |

Initial viscosity at about 120° F. was highest in the cheese sauce comprising inventive Starch A, which also provided the most dramatic drop in viscosity during processing. Starch A provided the most effective initial viscosity and water management effects to the cheese processing but yet effectively disappeared from a functional standpoint in the final cheese to a larger degree than the other starches.

Example 5

This Example compares micrographs from a sample of (1) the starch slurry, (2) the cooked starch slurry, (3) the cooked cheese sauce, and (4) the cooked cheese sauce after a final high shear step for each of the starches listed in Table 3 above. Each sample was diluted about 6 to about 7 fold using Lugol's iodine stain for the analysis. A small sample of each diluted cheese was prepared on a microscope slide and covered with a cover slide so that about a 22 mm by about a 44 mm sample was analyzed and viewed under 20× magnification.

About a 30 percent w/v starch slurry was prepared using each of the starches in Table 3. The starch slurry was cooked to a temperature providing peak gelatinization as measured in the cooker with a viscometer, at which point the cooked slurry was combined with natural cheese in accordance with Table 4 to prepare a cheese mixture for a cheese sauce. The cooked cheese sauce was subjected to a final high shear step.

Figure 4B:
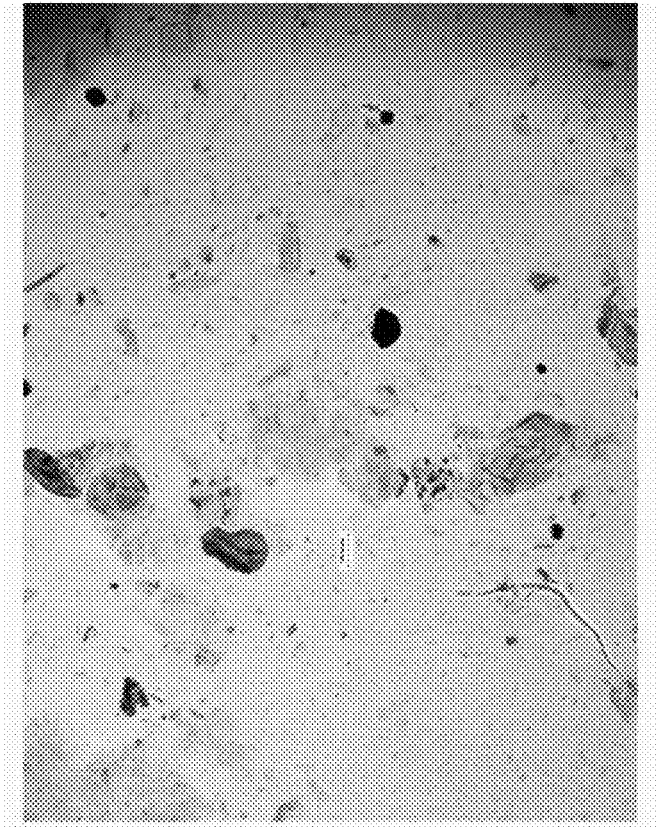
FIGS. 4A to 4D are micrographs of lightly substituted waxy corn starch in various cheese sauce processing stages.
Figure 4A:
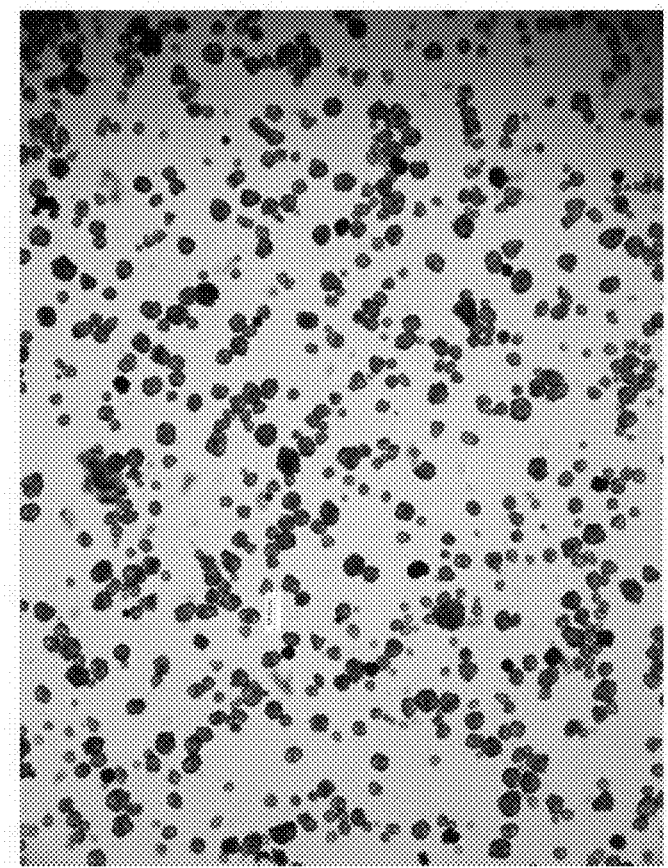

FIG. 4A is a micrograph of the one example of an inventive starch provided by lightly substituted waxy corn starch. FIG. 4A shows the uncooked lightly substituted waxy corn starch slurry. Individual uncooked granules are visible in FIG. 4A. The starch slurry was then cooked to a temperature of about 155° F. The cooked starch slurry of FIG. 4B shows mainly ruptured granules and a few remaining swollen granules of the starch, which includes amylopectin and essentially no amylose.

Figure 4D:
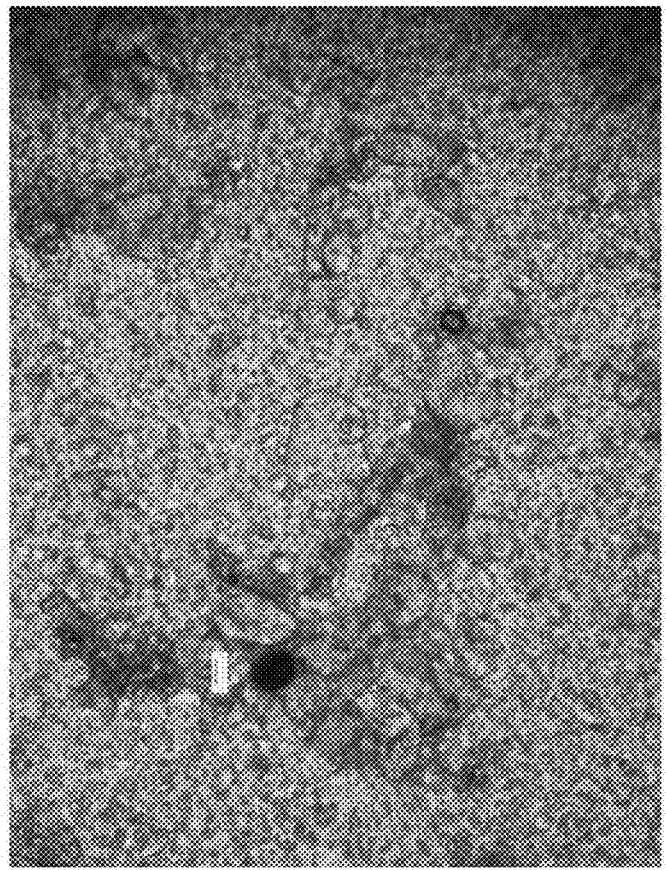
Figure 4C:
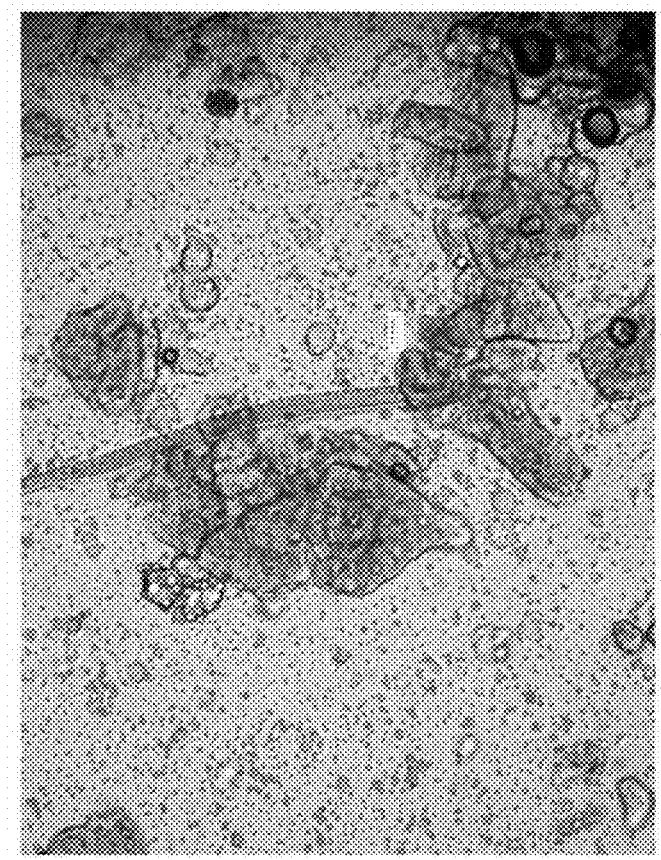

Next, the cooked starch slurry was combined with natural cheese to prepare a cheese sauce that was heated to about 162° F. The cooked cheese sauce of FIG. 4C shows that Starch A does not include any intact or identifiable starch granules as there are no dark or rust colors particulars observed in the micrograph after initial addition to the cooker. Lastly, FIG. 4D is a micrograph of Starch A in the cheese sauce after a final high shear step. No starch granules or aggregates were observed in the final cheese sauce.

Starch A gelatinizes and swells at the lowest temperature of the starches compared. The Starch A granules are fully swollen and already starting to rupture as the cooked slurry is being added to the natural cheese, appearing to immediately contribute high viscosity and water management capabilities at the beginning of the cook process (see FIG. 3). As the cooking process proceeds, the Starch A granules steadily decreases in its viscosity contribution as the starch granules rupture and are dispersed. By the end of the cooking process of FIG. 4C, no Starch A granules are visible, and no starchy aggregates are visible, allowing Starch A to provide a final product with desired texture and flavor release. The lightly substituted waxy corn starch contains amylopectin chains which shear degrade and disperse throughout the cheese mixture without aggregation.

Figure 5D:
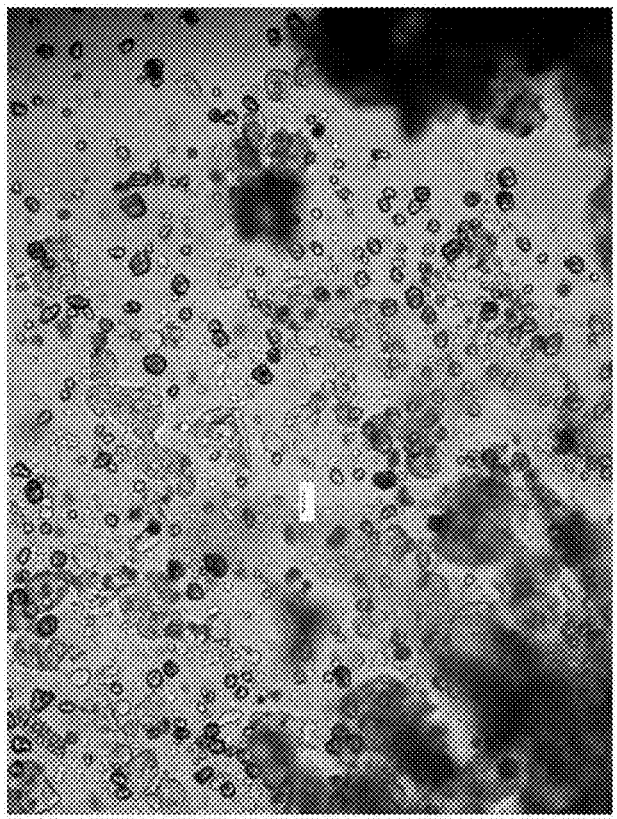
Figure 5C:
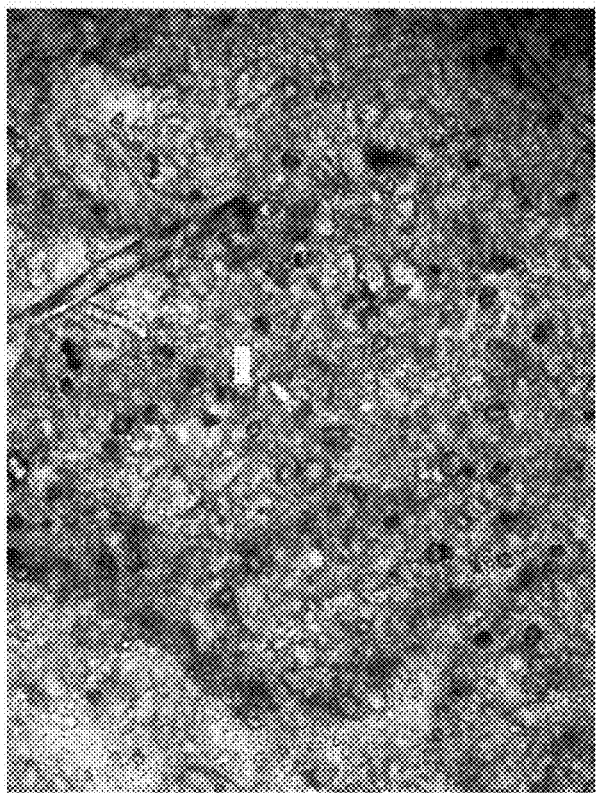

FIG. 5A is a micrograph of the uncooked Starch B slurry. Individual undercooked granules are visible in FIG. 5A. The starch slurry of FIG. 5A was cooked to a temperature of about 165° F. and combined with natural cheese to prepare a cheese sauce which was heated to about 162° F. The cooked starch slurry of FIG. 5B had some swollen granules, but appeared to have primarily undercooked granules. The cooked cheese sauce of FIG. 5C also contained undercooked granules. FIG. 5D is a micrograph of the Starch B in the cheese sauce after a final high shear step. Some undercooked Starch B granules are still observed in the final cheese sauce.

Starch B granules provide a sufficient number of swollen granules to contribute to the viscosity shown in FIG. 3 at the beginning of the cooking process.

Figure 6B:
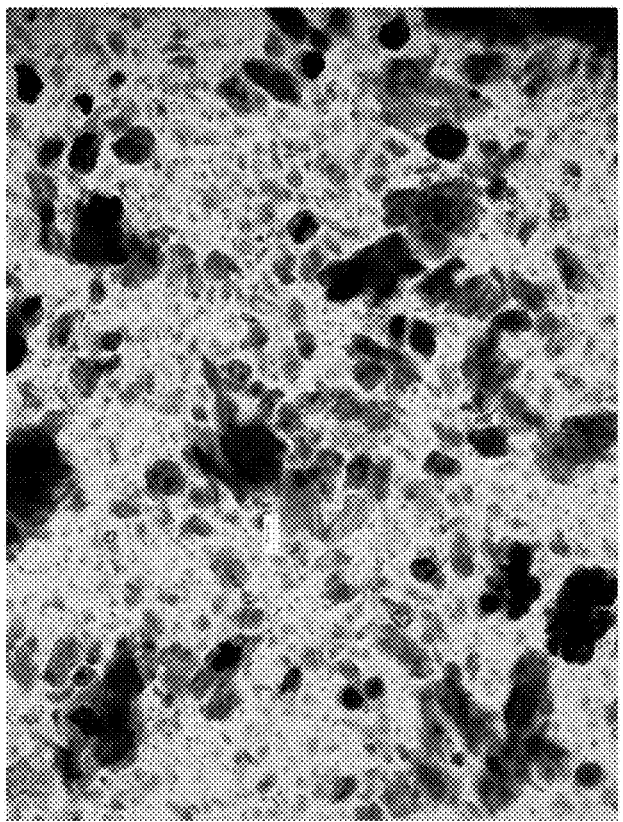
FIGS. 6A to 6D are micrographs of waxy corn starch in various cheese sauce processing stages.
Figure 6A:
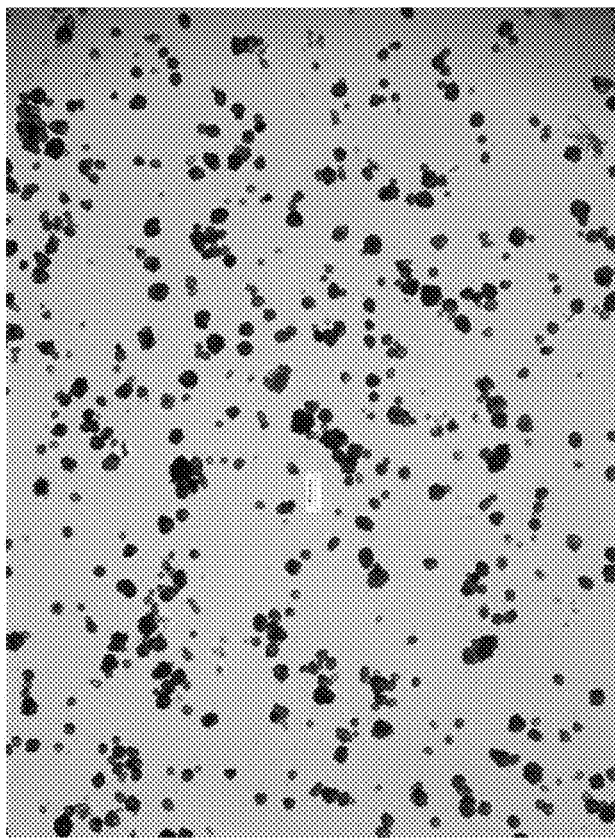
Figures 6C, 6D:
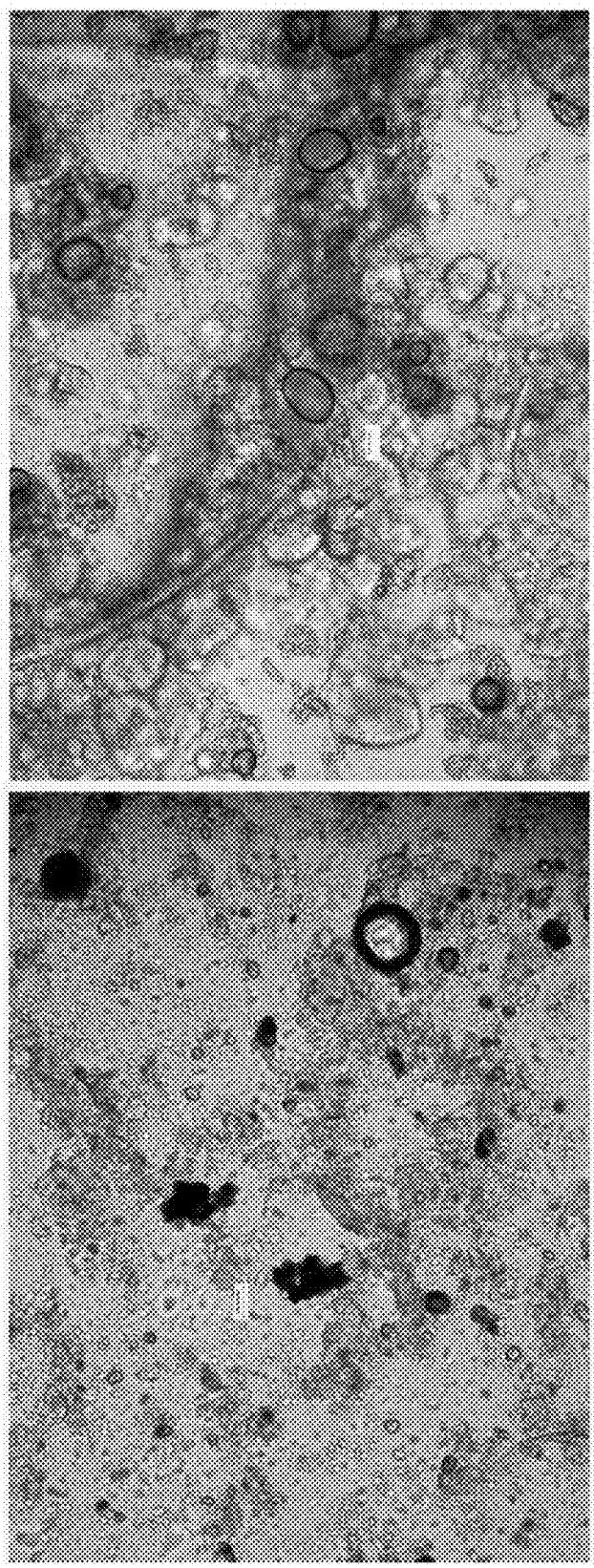

FIG. 6A is a micrograph of the uncooked unmodified Starch C. Individual uncooked granules are visible in FIG. 6A. The starch slurry of FIG. 6A was cooked to a temperature of about 160° F. and combined with natural cheese to prepare a cheese sauce which was heated to about 162° F. The cooked starch slurry of FIG. 6B comprises swollen granules with many ruptured granules. As seen in the cooked cheese sauce micrograph of FIG. 6C, starch granules of Starch C disappeared during the cooking process. FIG. 6D is a micrograph of Starch C in the cheese sauce after a final high shear step. Starch C was observed in starchy aggregates in the final cheese sauce as shown in the strips or bands of dark colors extending across the image.

Starch C starch granules were swollen with many ruptured granules upon addition to the natural cheese, but did not contribute as much viscosity to the cheese mixture as Starch A or B granules at the beginning of the cook process (see FIG. 3). At the end of the cook process, the final sheared cheese sauce of Starch C contained starchy aggregates of amylopectin from the ruptured starch granules, resulting in non-optimal flavors and textures in the final product. It is believed that the starchy aggregates result from amylopectin chains which are released from the starch granules, but are not sufficiently broken down to disperse evenly and to avoid aggregation.

Figure 7B:
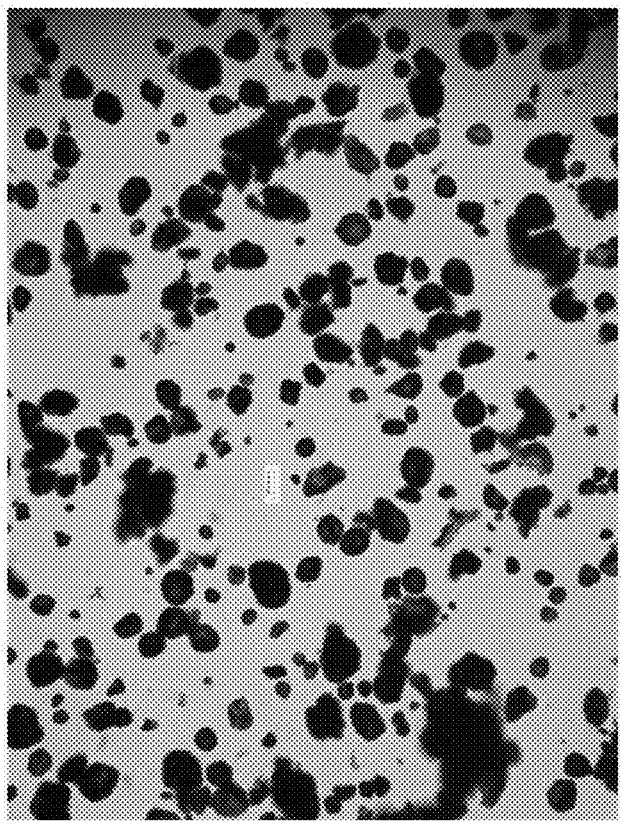
FIGS. 7A to 7D are micrographs of native corn starch in various cheese sauce processing stages.
Figure 7A:
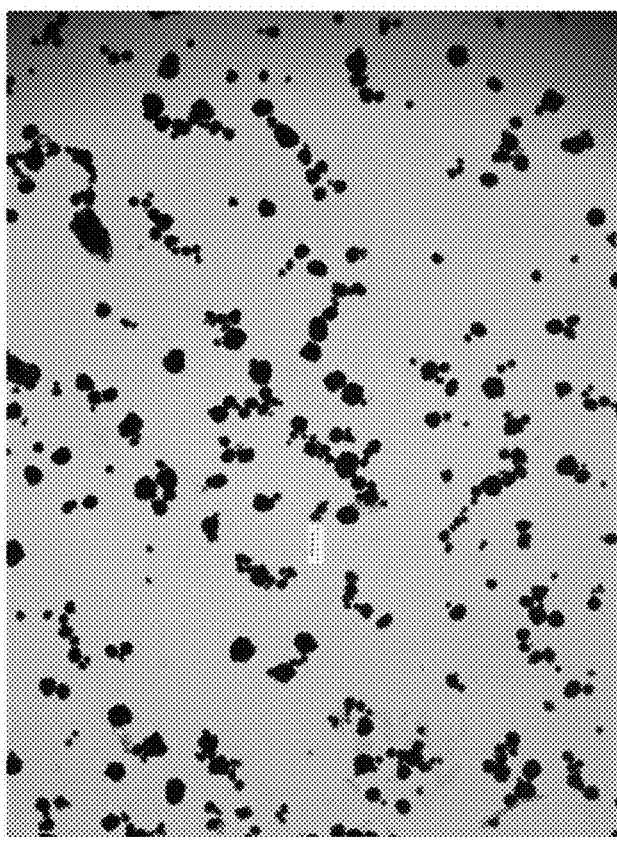
Figure 7D:
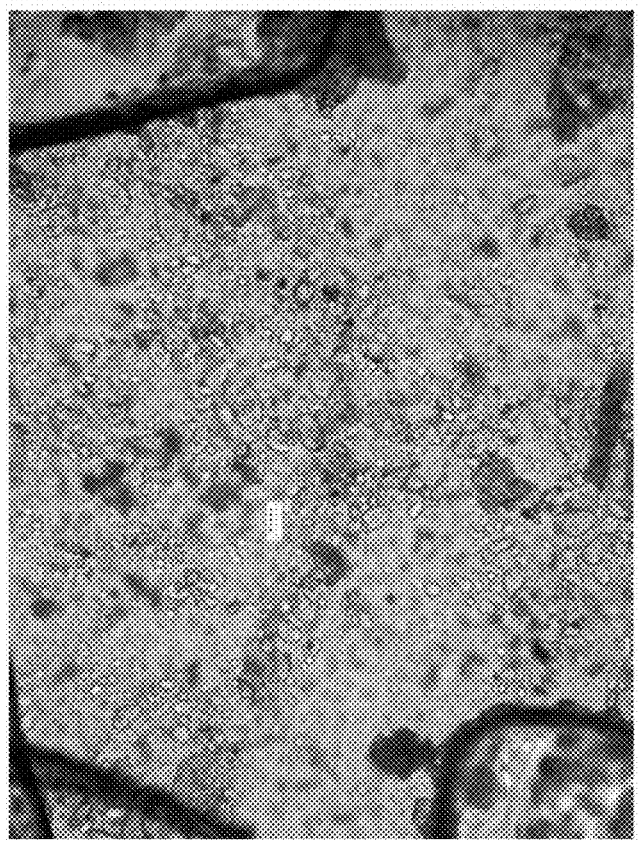
Figure 7C:
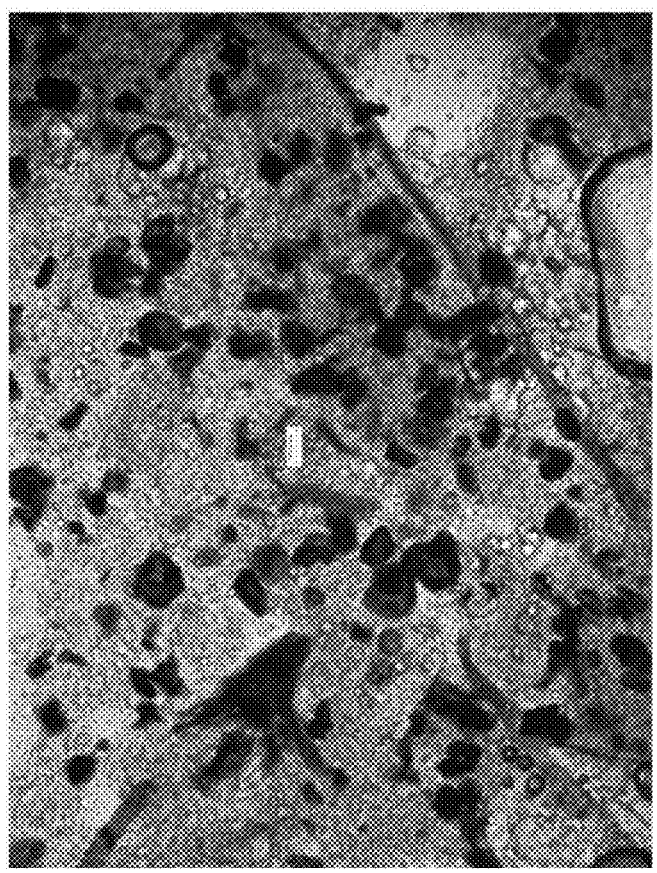

FIG. 7A is a micrograph of the uncooked Starch D. Individual uncooked granules are visible in FIG. 7A. The starch slurry of FIG. 7A was cooked to a temperature of about 165° F. and combined with natural cheese to prepare a cheese sauce which was heated to about 162° F. The cooked starch slurry of FIG. 7B was the least swollen of the cooked starch slurries, and had a sizeable population of undercooked granules. As seen in the cooked cheese sauce micrograph of FIG. 7C, uncooked Starch D starch granules are sill visible in the cooked cheese sauce. FIG. 7D is a micrograph of Starch D in the cheese sauce after a final high shear step. Starch granules were not observed in the final cheese sauce.

Starch D provided a low viscosity contribution to the cheese sauce at the beginning of the cheese cooking process (see FIG. 3). While starch granules were not observed in the final cheese sauce when using Starch D, this starch included amylose, which was released during the starch degradation that resulted in a gummy texture. While not wishing to be limited by theory, it is believed that the amylose in Starch D has a tendency to bind to each other, even when broken down due to shear degradation, and results in a gummy, undesirable texture.

Example 6

This Example compares the flavor and texture of a cheese sauce prepared using a lightly substituted waxy corn starch (Shur-FIL® 677) with cheese sauces prepared using native waxy corn starch, and native corn starch. The cheese sauce prepared using lightly substituted waxy corn starch was compared with the cheese sauces prepared using native waxy corn starch and native corn starch under cold and melted conditions for evaluation by a trained quantitative descriptive analysis panel utilizing a comprehensive consumer-based language which covers all modalities (appearance, aroma, flavor, texture, aftertaste) to describe the sensory experience. The aroma is assessed prior to tasting, by smelling the cheese sauce prior to tasting the cheese sauce in the mouth for evaluation of the remaining modalities.

In a cold evaluation, when compared to cheese sauce prepared using lightly substituted waxy corn starch, the cheese sauces using the native starches had the sensory characteristics listed in Table 6.

TABLE 6

| Cheese Sauce Using Native Waxy Corn Starch | Cheese Sauce Using Native Corn Starch |
|---|---|
| Weaker Overall Aroma | Weaker Overall Aroma |
| Denser Texture | Firmer Texture |
| Grainier Texture | Thicker Texture |
| Less Shiny Appearance | Stronger Bitterness |
| Stronger Powered Cheese Flavor | Stronger Sourness |
| Stronger Sourness | Weaker Saltiness |
| Weaker Saltiness | Weaker Cheddar flavor |
| Stronger Chemical Aftertaste | Stronger Milky Flavor |

In a melted evaluation, when compared to cheese sauce prepared using lightly substituted waxy corn starch, the cheese sauces using the native starches had the sensory characteristics listed in Table 7.

TABLE 7

| Cheese Sauce Using Native Waxy Corn Starch | Cheese Sauce Using Native Corn Starch |
|---|---|
| Stronger Cheddar Armoa | Stronger Overall Aroma |
| Weaker Saltiness | Oilier Appearance |
| Weaker Bitterness | Thicker Texture |
| Grainier Texture | Grainier Texture |
| Stronger Powered Cheese Flavor | Stronger Powdered Cheese Flavor |
| Weaker Cheddar Flavor | Stronger Saltiness |
| Stronger Salty Aftertaste | Stronger Sourness |

The difference between the stronger aroma of the cheese sauce prepared using the lightly substituted waxy corn starch as compared to the cheese sauce prepared using the native starches in the cold evaluation is more pronounced than the difference between the stronger aroma of the cheese sauces prepared using the native starches as compared to the cheese sauce prepared using the lightly substituted waxy corn starch in the melted evaluation.

Example 7

This Example compares the flavor and texture of a cheese sauce prepared using erythorbic acid impregnated waxy corn starch with cheese sauces using native waxy corn starch, and native corn starch. The cheese sauce prepared using erythorbic acid impregnated waxy corn starch was compared with the cheese sauces prepared using native waxy corn starch and native corn starch under cold and melted conditions in the same manner as in Example 6.

In a cold evaluation, when compared to cheese sauce prepared using erythorbic acid impregnated waxy corn starch, the cheese sauces using the native starches had the sensory characteristics listed in Table 8.

TABLE 8

| Cheese Sauce Using Native Waxy Corn Starch | Cheese Sauce Using Native Corn Starch |
|---|---|
| Weaker Overall Aroma | Weaker Overall Aroma |
| Thicker Texture | Shinier Appearance |
| Grainier Texture | Thicker Texture |
| Stronger Off-Flavors (Smokey, Plastic) | Slower Melt Rate |
| Stronger Bitterness | Stronger Saltiness |
| Stronger Saltiness | Stronger Off-Flavors (Stale, Soapy) |
| Weaker Cheddar Flavor | Weaker Cheddar Flavor |
| More Mouthdrying Mouthfeel | Stronger Lingering Aftertaste |
|  | More Mouthdrying Mouthfeel |

In a melted evaluation, when compared to cheese sauce prepared using lightly substituted waxy corn starch, the cheese sauces using the native starches had the sensory characteristics listed in Table 9.

TABLE 9

| Cheese Sauce Using Native Waxy Corn Starch | Cheese Sauce Using Native Corn Starch |
|---|---|
| Weaker Overall Aroma | Weaker Overall Aroma |
| Weaker Cheese Aroma | Thicker Texture |
| Stronger Saltiness | Stronger Butter Flavor |
| Weaker Bitterness | Stronger Bitterness |
| Stronger Milky Flavor | |
| Stronger Butter Flavor | |
| Weaker Overall Cheese Flavor | |

It will be understood that various changes in the details, materials, and arrangements of formulations and ingredients, which have been herein described and illustrated in order to explain the nature of the method and compositions, may be made by those skilled in the art within the principle and scope of the description and claims herein.

What is claimed is:

1. A processed cheese comprising:
   a natural cheese or a mixture of natural cheeses providing from about 5 weight percent to about 30 weight percent dairy protein;
   about 30 weight percent to about 80 weight percent water;
   about 0.5 weight percent or less of emulsifying salts;
   about 0.1 weight percent to about 10 weight percent of a non-crosslinked modified starch having a degree of substitution of less than about 0.2 D.S. and containing amylopectin and substantially no amylose; and
   a uniform distribution of amylopectin with substantially no intact starch granules and substantially no starch agglomerates with less than about 0.1 weight percent amylose so that the processed cheese has substantially no amylose therein, the amylopectin and amylose from the modified starch in a form and in a ratio effective to provide substantially no texture or flavor to the processed cheese,
   wherein the modified starch is a monosubstituted hydroxypropylated waxy corn starch, and wherein the modified starch has a profile such that if the modified starch were to be mixed with water to form an 8 percent (w/w) starch paste and the starch paste were to be heated between about 65° C. to about 95° C., the heated starch paste would exhibit an initial viscosity increase of about 2500 cps to about 3000 cps within a first 5 minutes of heating followed by a continuous viscosity decrease to below about 1000 cps during a following 10 minutes of heating.

2. The processed cheese of claim 1, wherein the modified starch is effective to provide less than about 10 intact starch granules of amylopectin per about 900 mm² of processed cheese as determined by Lugol's iodine stain at about 20× magnification such that there are substantially no intact starch granules of amylopectin in the processed cheese.

3. The processed cheese of claim 1, wherein the processed cheese contains no intact starch granules, no starch agglomerates, and no amylose.

4. The processed cheese of claim 1, wherein the processed cheese has a ratio of amylopectin to amylose from about 20 to about 200.

5. The processed cheese of claim 1, wherein the cheese product is selected from the group consisting of sauce, spread, slice, shred, stick, loaf and brick.

6. The processed cheese of claim 1, wherein the processed cheese containing the modified starch exhibits a viscosity decrease of about 50,000 cps to about 60,000 cps during heating at about 65° C. to about 75° C. upon the modified starch being initially added to the processed cheese after gelatinization of the modified starch.

7. A method of preparing an emulsifying salt-free processed cheese, the method comprising the steps of:
   heating a blend of water and a non-crosslinked modified starch having a degree of substitution of less than about 0.2 D.S. and containing amylopectin and substantially no amylose to its gelatinization temperature to form a cooked starch paste;
   blending the cooked starch paste and natural cheese or a mixture of natural cheeses with water to form a cheese mixture where the cheese mixture contains about 0.5 weight percent or less of emulsifying salts; and heating the cheese mixture to form the emulsifying salt-free processed cheese, the amount of modified starch containing amylopectin and substantially no amylose being effective to form the processed cheese having a uniform distribution of amylopectin with substantially no intact starch granules and substantially no starch agglomerates and less than about 0.1 percent amylose so that the processed cheese has substantially no amylose in the processed cheese, wherein the modified starch is a monosubstituted hydroxypropylated waxy corn starch, and wherein the modified starch has a profile such that if the modified starch were to be mixed with water to form an 8 percent (w/w) starch paste and the starch paste were to be heated from about 65° C. to about 95° C., the starch paste would exhibit an initial viscosity increase of about 2500 cps to about 3000 cps within a first 5 minutes of heating, followed by a continuous viscosity decrease to below about 1000 cps during a following 10 minutes of heating.

8. The method of claim 7, wherein the cheese mixture containing the modified starch exhibits a viscosity decrease of about 50,000 cps to about 60,000 cps during heating at about 65° C. to about 75° C.

9. The method of claim 7, wherein the blend of water and modified starch containing amylopectin and substantially no amylose is heated to about 65° C. to about 75° C. to form the cooked starch paste having a viscosity from about 2500 cps to about 3000 cps.

10. The method of claim 7, wherein a viscosity of the cheese mixture decreases from an initial viscosity of about 60,000 cps to about 65,000 cps to a final viscosity of about 2500 cps to about 3500 cps at about 65° C. to about 75° C.

11. The method of claim 7, wherein the cheese mixture contains about 1 percent to about 3 percent of the modified starch containing amylopectin and substantially no amylose.

12. The method of claim 7, wherein the processed cheese contains about 5 percent to about 95 percent natural cheese or a mixture thereof.

13. The method of claim 7, wherein the processed cheese is a selected from the group consisting of sauce, spread, slice, shred, stick, loaf and brick.

14. The method of claim 7, wherein the cooked starch paste is sheared prior to blending the cooked starch paste with the natural cheese or a mixture of natural cheeses with water to form a cheese mixture.

15. The processed cheese of claim 1, wherein the modified starch has a pasting profile comprising the following viscosities when the modified starch is mixed with water and heated from about 65° C. to about 95° C.:

a viscosity of at least about 2500 cps within 5 minutes of heating;

a viscosity of about 1400 cps to about 1500 cps at 8 minutes of heating; and a viscosity of no more than about 1000 cps at 14 minutes of heating.

16. The method of claim 7, wherein the modified starch has a pasting profile comprising the following viscosities when the modified starch is mixed with water and heated from about 65° C. to about 95° C.:

a viscosity of at least about 2500 cps within 5 minutes of heating;

a viscosity of about 1400 cps to about 1500 cps at 8 minutes of heating; and a viscosity of no more than about 1000 cps at 14 minutes of heating.

17. A processed cheese comprising:

a non-calcium-reduced natural cheese or a mixture of non-calcium-reduced natural cheeses providing from about 5 weight percent to about 30 weight percent dairy protein;

about 30 weight percent to about 80 weight percent water;

about 0.5 weight percent or less of emulsifying salts;

about 0.1 weight percent to about 10 weight percent of a non-crosslinked monosubstituted hydroxypropylated waxy corn starch having a degree of substitution of less than about 0.2 D.S. and having a profile such that if the modified starch were to be mixed with water to form an 8 percent (w/w) starch paste and the starch paste were to be heated between about 65° C. to about 95° C. the heated starch paste would exhibit an initial viscosity increase of about 2500 cps to about 3000 cps within a first 5 minutes of heating followed by a continuous viscosity decrease to below about 1000 cps during a following 10 minutes of heating.

18. The processed cheese of claim 17, wherein the modified starch is effective to provide less than about 10 intact starch granules of amylopectin per about 900 mm$^2$ of processed cheese as determined by Lugol's iodine stain at about 20× magnification such that there are substantially no intact starch granules of amylopectin in the processed cheese.

19. The processed cheese of claim 17, wherein the processed cheese has a ratio of amylopectin to amylose from about 20 to about 200.

\* \* \* \* \*